United States Patent
Saitou

(10) Patent No.: US 8,391,333 B2
(45) Date of Patent: Mar. 5, 2013

(54) PREAMBLE DETECTION APPARATUS, PREAMBLE DETECTION METHOD, AND PROGRAM

(75) Inventor: Chizuru Saitou, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 122 days.

(21) Appl. No.: 12/951,784

(22) Filed: Nov. 22, 2010

(65) Prior Publication Data

US 2011/0122923 A1 May 26, 2011

(30) Foreign Application Priority Data

Nov. 24, 2009 (JP) ................................. 2009-266432

(51) Int. Cl.
*H04B 1/00* (2006.01)

(52) U.S. Cl. ........ 375/136; 375/147; 375/260; 375/267; 375/142; 375/343; 375/349

(58) Field of Classification Search .................. 375/136, 375/147, 260, 267, 142, 343, 349
See application file for complete search history.

(56) References Cited

U.S. PATENT DOCUMENTS

| 5,765,127 | A  | * | 6/1998  | Nishiguchi et al. | ........... 704/208 |
| 7,822,152 | B2 |   | 10/2010 | Inagawa et al.    |                    |
| 2004/0170238 | A1 | * | 9/2004  | Matsuyama et al. | .......... 375/343 |
| 2004/0202229 | A1 | * | 10/2004 | Raphaeli et al.   | .............. 375/145 |
| 2005/0220230 | A1 | * | 10/2005 | Fukuda           | ......................... 375/343 |
| 2008/0043886 | A1 | * | 2/2008  | Inagawa et al.    | ................ 375/343 |

FOREIGN PATENT DOCUMENTS

JP 2008-48239 (A) 2/2008

* cited by examiner

*Primary Examiner* — Kabir A Timory
(74) *Attorney, Agent, or Firm* — Foley & Lardner LLP

(57) ABSTRACT

A preamble detection apparatus includes: a threshold generation unit that determines a correlation maximum value detection threshold on the basis of a correlation peak value; a determination unit that detects one of correlation results, which exceeds the correlation maximum value detection threshold, as a correlation maximum value; a detection unit that updates the correlation peak value to the detected correlation maximum value when the correlation maximum value is detected; and a control unit that sets a period, in the event a correlation peak occurs, to a first period, sets a period, centering on a position where a distance from a correlation peak position is an integer multiple of a frequency hopping cycle, to a second period, and monitors presence or absence of a correlation result that exceeds the correlation maximum value detection threshold in the first and second periods, while not applying an erroneous detection threshold to the first period.

15 Claims, 15 Drawing Sheets

US 8,391,333 B2

PREAMBLE DETECTION APPARATUS, PREAMBLE DETECTION METHOD, AND PROGRAM

REFERENCE TO RELATED APPLICATION

This application is based upon and claims the benefit of the priority of Japanese patent application No. 2009-266432, filed on Nov. 24, 2009, the disclosure of which is incorporated herein in its entirety by reference thereto. The present invention relates to a preamble detection apparatus, a preamble detection method, and a program in wireless communication. More specifically, the invention relates to a preamble detection apparatus, a preamble detection method, and a program in wireless communication represented by MB-OFDM (Multi-Band Orthogonal Frequency Division Multiplexing) system that performs frequency hopping.

TECHNICAL FIELD

Background

As a wireless communication system that performs frequency hopping, there is the MB-OFDM system. In the MB-OFDM system, a preamble signal constituted from a repetition of a known pattern is added to the beginning of a received signal, and is transmitted according to a certain rule, while being frequency hopped. The frequency hopping refers to a method in which, by temporarily switching the frequency of a carrier wave according to a specific pattern, a plurality of frequency bands are hopped to implement spreading. FIG. 11 is a diagram showing a preamble signal in the MB-OFDM system as an example. Referring to FIG. 11, the preamble signal constituted from 24 preamble symbols (hereinafter referred to as "symbols") per packet is transmitted with three frequencies being hopped.

An MB-OFDM receiver includes three local oscillators (LO: Local Oscillators) each for receiving a frequency-hopped signal in order to avoid inclusion of three receiving systems and to reduce cost and power consumption, and usually causes the three LOs to be operated. By synchronizing frequencies of three LO outputs with the frequency hopping for selection by a band switch, the symbols that are present at each hopped frequency arc received and demodulated by one receiving system. At a start of reception, however, it is necessary to receive a high-frequency (RF: Radio Frequency) signal, frequency-convert the received radio frequency signal to a baseband (BB: Base Band) signal, and performs symbol timing synchronization and preamble detection, using a result of a correlating operation between the BB signal and the fixed pattern of the preamble signal. This operation is performed in a state where the frequency of an LO output is fixed at a standby frequency (such as a frequency band 1 in FIG. 11) so as to capture the preamble signal that is being frequency hopped, without fail.

When performing the frequency hopping in the MB-OFDM system, frequency switching is performed within a predetermined period of time. In the MB-OFDM system, a method is used where the frequency switching is performed by the band switch in synchronization with the frequency hopping with the LOs being operated as described above. When isolation of the band switch is not sufficient, however, LO outputs that are not selected by the band switch leak out as local oscillator spuriouses (Local Oscillator Spurious, LO spurious). In the case of the MB-OFDM system that uses the high frequency signal (4 G to 9 GHz), it becomes difficult to ensure isolation of the band switch and reduce occurrence of the LO spuriases.

When an LO spurias component of a frequency other than the standby frequency is present in the LO output due to insufficient isolation of the band switch as described above, an RF signal that is present in a band other than a desired frequency band and is not normally frequency-converted is also frequency-converted to a base band signal, in addition to the RF signal that is present in the desired frequency band. Further, assume that an RF signal level of a strong input of which a BB signal level after frequency conversion exceeds an analog-to-digital converter (ADC: Analog-to-Digital Converter) dynamic range has been received. Then, the RF signal exceeds a clipping level. The BB signal after frequency conversion of the RF signal that has exceeded the clipping level assumes a certain value (hereinafter referred to as "clip") corresponding to the upper limit value of the BB signal. In this case, a state arises which has a small level difference between the BB signal obtained by frequency-converting the RF signal of the desired frequency hand and the BB signal obtained by frequency-converting the RF signal of the frequency hand in which the LO spurious component is produced. Further, when the influence of noise is added in this condition, a state arises where the BB signal caused by the LO spurious component slightly exceeds the BB signal of the desired frequency band. Accordingly, the BB signal caused by the LO spurious component becomes a noise component unwanted for preamble detection.

By enlarging the ADC dynamic range, the clip of the BB signal after frequency conversion can be prevented. As a method of enlarging the ADC dynamic range, there is a method of increasing a supply voltage. However, the resolution of an ADC output is reduced just by increasing the supply voltage. Accordingly, it is necessary to maintain the resolution which is the same as that before the supply voltage is increased. In order to maintain the same resolution, it is necessary to increase the bit width of a digital circuit in a subsequent stage of the ADC as well as to increase the bit width of the ADC. Thus, the circuit size increases, and the chip area and power consumption also increase.

As described above, it is difficult to reduce occurrence of LO spurious and implement an ADC with a dynamic range that prevents the clip even at a time of receiving the strong input. Then, the need for a preamble detection method capable of excluding the influence caused by the LO spurious component at a time of the strong input is increased.

Patent Document 1 describes a technique of executing detection of a preamble. In this technique, when detecting a symbol timing from a received signal, the following symbol timing detection method is used. In this method, a correlation between the received signal and a fixed preamble pattern is determined to sequentially obtain a correlation result. The received signal is constituted from a packet in which the preamble comprising a repetition of symbols is disposed at the beginning of data. A maximum value of sequentially obtained correlation results is held while being updated. On condition that the held maximum value is not updated in a symbol timing determination period of a predetermined length from the timing of the maximum value and the number of occurrences of the correlation result exceeding an erroneous detection threshold is smaller than a predetermined number in an erroneous detection determination period within the symbol timing determination period, the timing of the maximum value is determined as the symbol timing. As described above, the symbol timing is detected by the symbol timing detection method. Then, by confirming symbol periodicity using a periodicity confirmation window opened according to a symbol length on the basis of the detected symbol timing, the preamble is detected.

FIG. 9 is a block diagram showing a configuration of a preamble detection apparatus described in Patent Document 1. Referring to FIG. 9, a preamble detection apparatus 100 includes an antenna 101, an RF (Radio Frequency) unit 102, an A/D conversion unit 103, a complex correlation unit 111, and a detection execution unit 200.

The antenna 101 receives a signal in a radio frequency band and outputs the received signal to the RF unit 102. The RF unit 102 converts this signal in the radio frequency band to complex base band signals (indicated by reference characters I and Q in FIG. 9). The A/D conversion unit 103 includes A/D convertors, and converts the complex base band signals of the A/D convertors to a digital signal. The complex correlation unit 111 stores the fixed pattern of a preamble signal, and determines a correlation between the digital signal from the A/D conversion unit 103 and the fixed pattern to output a correlation result R to the detection execution unit 200.

Referring to FIG. 9, the detection execution unit 200 includes a correlation peak detection unit 112, a preamble detection threshold generation unit 115, a preamble determination unit 116, an erroneous detection threshold generation unit 113, an erroneous detection determination unit 114, and a control unit 117 that performs control over these units and obtains a preamble detection result W.

The control unit 117 functions as a symbol timing detection control unit (not shown) and a preamble detection control unit (not shown). Parts of the erroneous detection threshold generation unit 113, the erroneous detection determination unit 114, and the control unit 117 constitute a symbol timing determination unit. The preamble detection threshold generation unit 115 and the preamble determination unit 116 constitute a periodicity confirmation unit.

The control unit 117 supplies a correlation peak detection enabling signal Q3 and a correlation peak value reset signal Q2 to the correlation peak detection unit 112, supplies an erroneous detection determination enabling signal G2 to the erroneous detection determination unit 114, and supplies a preamble determination enabling signal K2 to the preamble determination unit 116.

In a period where the correlation peak detection enabling signal Q3 from the control unit 117 is active (hereinafter referred to as a "correlation peak detection period"), the correlation peak detection unit 112 performs processing of holding the maximum value of the correlation result R while updating the maximum value (hereinafter referred to as a "correlation peak detection processing"), based on the correlation result R supplied from the complex correlation unit ill, and holds the maximum value and the timing of the maximum value. That is, the correlation peak detection unit 112 holds the maximum value in a period from a start of the correlation peak detection processing (from a time of reset when the reset has been made after the start of the correlation peak detection processing) to a current time.

FIG. 10 is a diagram showing an operating period of the preamble detection apparatus 100 described in Patent Document 1.

It is herein assumed that a timing A2 of a correlation peak value P is established as a symbol timing. A timing established by this timing A2 is a termination point A4 of a first symbol timing determination period T2. When the symbol timing is established, the control unit 117 causes the preamble determination enabling signal K2 to be active, thereby causing the preamble determination unit 116 to confirm periodicity. The periodicity is confirmed in a periodicity confirmation window. A period from reference symbol A4 to reference symbol B2 shown in FIG. 10 is the periodicity confirmation window, or a preamble determination period T3. When the timing A2 of the correlation peak value P is a true symbol timing, there is a correlation result that exceeds a preamble detection threshold D at a timing B1 shown in FIG. 10. The periodicity confirmation thereby succeeds.

Patent Document 1 defines that the preamble is detected when periodicity confirmation successively succeeds twice. Accordingly, when the periodicity confirmation succeeds in a first preamble determination period, the control unit 117 sets a second preamble determination period (after a timing indicated by reference symbol B4 in FIG. 10), not shown in FIG. 10, thereby causing the preamble determination unit 116 to make second-time periodicity confirmation. On the other hand, when the periodicity confirmation fails in the first preamble determination period or when the periodicity confirmation fails in the second preamble determination period even if the periodicity confirmation has succeeded in the first preamble determination period, it is determined that the preamble is not detected. Then, the control unit 117 causes the correlation peak detection unit 112 to reset the correlation peak value P to start over the correlation peak detection processing and symbol timing determination processing from a point when the reset has been made.

Even after the symbol timing has been established, a segment excluding the preamble determination period T3 is set to the correlation peak detection period. Then, the correlation peak detection processing is continued in this period. Together with the correlation peak detection processing, it is determined whether or not the symbol timing A2 is the true symbol timing. Thus, the correlation peak detection period is also a symbol timing determination period T6. The symbol timing determination period T6 is herein referred to as a second symbol timing determination period in order to distinguish from the first symbol timing determination period T2 before the symbol timing is established. The second symbol timing determination period T6 is also constituted from an erroneous detection determination period (second erroneous detection determination period T5) and an erroneous detection determination delay period (second erroneous determination delay period T4).

Assume that determination as to the preamble has succeeded in the preamble determination period T3 and that the correlation peak value P is not updated and determination as to erroneous detection is not performed in the second symbol timing determination period T6 from a timing B2 to the timing B4. Then, the control unit 117 sets the second preamble determination period on the basis of the symbol timing A2 after the timing B4 in order to make second-time preamble determination. The control unit 117 causes the preamble determination unit 116 to confirm periodicity again. When the periodicity confirmation succeeds in the second preamble determination period as well, the control unit 117 regards the preamble has been detected, and outputs "1" as the preamble detection result W.

Patent Document 1:

JP Patent Kokai Publication No. JP2008-048239A (Pages 8 to 14, FIGS. 1, 6, and 17)

SUMMARY

The entire disclosure of the above mentioned Patent Document is incorporated herein by reference thereto. The following analyses are given by the present invention.

According to the technique described in Patent Document 1, an LO spurious signal of a frequency other than the standby frequency is present in an LO output. When a strong input signal that exceeds the ADC dynamic range is received, a preamble detection characteristic at a time of receiving the strong input deteriorates.

When a correlation peak caused by the LO spurious component occurs in the erroneous detection determination period, the number of correlations that exceed the predetermined erroneous detection threshold increases. Then, when the erroneous detection threshold is relaxed, the number of erroneous detections that detect a wave other than a desired wave increases. Thus, the preamble detection characteristic at the time of the receiving the strong input deteriorates.

With reference to FIG. 12, description will be directed to an operation of executing detection of the preamble signal when the LO spurious signal of the frequency other than the standby frequency is present in the LO output and the strong input signal that exceeds the ADC dynamic range has been received. The preamble signal is shown in FIG. 11 and is transmitted with the three frequencies being hopped.

Referring to FIG. 12, a received signal 300 is frequency-hopped in the order of a frequency band f1, a frequency band f2, a frequency band f3, the frequency band f1, and so on. The frequency band f1 is set to the standby frequency and the LO spurious signal is assumed to be produced in the frequency band f2. In this case, in addition to a preamble that is present in the frequency band f1, which is the standby frequency, a preamble that is present in the frequency band f2 is also frequency-converted to a BB signal by the RF unit 102. Further, since the strong input signal has been received, a clip occurs in a BB signal after the frequency conversion. A difference between the level of the BB signal obtained by frequency converting the RF signal of the frequency band f1 and the level of the BB signal obtained by frequency converting the RF signal of the frequency band f2 is therefore reduced. A result obtained by a correlating operation on such a BB signal as described above by the complex correlation unit 111 is output as the correlation result R. Thus, each of preamble correlation results Z1 and Z2 of the frequency band f2 caused by LO spurious occurs at a level close to that of a preamble correlation result P1 of the frequency band f1.

According to the preamble detection apparatus 100 (in FIG. 9) described in Patent Document 1, when the correlation result P1 of the preamble in the standby frequency is detected in such a state after execution of initialization processing, the correlation peak value P is updated by the correlation peak detection unit 112 at the timing of detection, and the correlation result P1, which is the maximum value of the correlation results R obtained so far, is held as the correlation peak value P. Together with the updating of the correlation peak value P, a correlation peak timing signal Q1 that will be output from the correlation peak detection unit 112 also assumes "1." "N1" is set to an erroneous detection threshold N, "D1" is set to the preamble detection threshold D, and a timer (not shown in FIG. 9) of the control unit 117 is reset to "0."

The control unit 117 keeps the erroneous detection determination enabling signal G2 at "0" and prohibits determination of erroneous detection in a first erroneous detection determination delay period T0 on the basis of the correlation peak P1 (in which the value of the timer is not larger than T0). Then, when the value of the timer exceeds T0, transition is made to a first erroneous detection determination period T1. Then, the control unit 117 sets the erroneous detection enabling signal G2 to "1," thereby causing the erroneous detection determination unit 114 to determine erroneous detection.

The erroneous detection determination unit 114 monitors whether the number of the correlation results R that exceed the error detection threshold N1 is larger than a threshold for the number of times of erroneous detection. In the first erroneous detection determination period T1 (indicated by reference symbol F2 in FIG. 12) on the basis of the correlation peak value P1 in the example shown in FIG. 12, the correlation results Z1 and Z2 caused by LO spuriouses are present in addition to noise Y1 and each of the correlation results Z1 and Z2 exceeds the erroneous detection threshold N1.

Assume that the threshold for the number of times of erroneous detection is set to three. Then, it is determined that erroneous detection has been made at a correlation timing immediately before the correlation result P2 of the correlation result R. Accordingly, the control unit 117 causes the correlation peak value reset signal Q2 to be active, performs the initialization processing of returning the correlation peak value P to an initial value zero, and further updates the correlation peak value P to P2. The symbol timing determination processing is then started over.

After the correlation peak value P has been updated to P2, a correlation result P3, which is larger than the correlation result P2, is present (in a period indicated by reference symbol F4 in FIG. 12) in the first erroneous detection determination period T1 on the basis of the correlation peak value P2, as shown in FIG. 12. Thus, the correlation peak detection unit 112 updates the correlation peak value P to P3. Further, a correlation result P4 of the preamble in the standby frequency band, which is larger than the correlation result P3, is present (in a period indicated by reference symbol F6 in FIG. 12) in the first erroneous detection determination period T1 on the basis of the correlation peak value P3. Thus, the correlation peak detection unit 112 updates the correlation peak value P to P4.

Even in a period after the correlation peak value P has been updated to P4, correlation results as shown in the correlation results P1 to P4 in FIG. 12 repeatedly occur. That is, even if a symbol is capable of being used for preamble detection, erroneous detection of the symbol is determined due to a correlation results caused by the LO spurious. Then, the correlation peak value P is updated to repeat determination of error detection in the first erroneous detection determination period T1 through the first erroneous determination delay period T0. As a result, the preamble of even a desired wave is determined to have been erroneously detected. The preamble detection characteristic thereby deteriorates.

Deterioration of the preamble detection characteristic described above can be prevented by changing the erroneous detection threshold N. That is, when the value of the erroneous detection threshold N1 in the first erroneous detection determination period T1 on the basis of the correlation peak value P1 is relaxed to be higher than Z1, the correlation results Z1 and Z2 caused by the LO spurious will not influence determination of erroneous detection. However, when the erroneous detection threshold is relaxed, it is erroneously determined that a preamble has been detected even if a signal other than the preamble of the desired wave has been received.

FIG. 13 shows an example of a correlation waveform when the signal other than the preamble of the desired wave has been received. When the signal other than the preamble of the desired wave has been received, correlation results are not correlated, as shown in FIG. 13. Accordingly, a difference between levels of the value of a correlated peak value and noise other than the correlated peak in the correlated waveform is reduced more than in a case where the desired wave has been received. Assume the erroneous detection threshold N on the basis of a correlation peak P11 at a certain point of time. When N11 set to the erroneous detection threshold as in FIG. 12 is applied as the erroneous detection threshold N, there are a lot of the correlation results R that exceed the erroneous detection threshold N11. Thus, it can be determined that erroneous detection of a received signal 301 has been made. On the other hand, when an erroneous detection threshold N11a that is relaxed more than the erroneous detection threshold N11 is applied, approximately one correlation result that exceeds the erroneous detection threshold N11a occurs per symbol. As a result, preamble detection is performed at an erroneous correlation peak timing. The preamble detection result W is set to one at an erroneous timing of a correlation peak P12.

As described above, when the erroneous detection threshold is relaxed so as to prevent deterioration of the preamble detection characteristic, identification performance of the desired wave deteriorates, so that preamble detection of an unintended signal is made. By detecting the unintended signal to perform a demodulation process, the desired wave that may have been transmitted during detection and the demodulation process of the unintended signal cannot be detected. As a result, deterioration in the preamble detection characteristic is brought about.

There is a need in the art to provide a preamble detection apparatus, a preamble detection method, and a program in order to improve the preamble detection characteristic in a wireless communication system that performs frequency hopping.

According to a first aspect of the present invention, there is provided a preamble detection apparatus in a wireless communication system which performs frequency hopping, comprising:
a correlation maximum value detection threshold generation unit that determines a correlation maximum value detection threshold on the basis of a correlation peak value;
a correlation maximum value detection determination unit that detects one of correlation results, which exceeds the correlation maximum value detection threshold, as a correlation maximum value;
a correlation peak detection unit that updates the correlation peak value to the detected correlation maximum value when the correlation maximum value is detected by the correlation maximum value detection determination unit; and
a control unit that sets a period, where a correlation peak caused by an LO spurious (Local Oscillator Spurious) component may occur, to a first period, sets a period, centering on a position where a distance from a correlation peak position is an integer multiple of a frequency hopping cycle, to a second period, and monitors presence or absence of a correlation result that exceeds the correlation maximum value detection threshold in the first and second periods, while not applying an erroneous detection threshold to the first period.

According to a second aspect of the present invention, there is provided a preamble detection method in a wireless communication system that performs frequency hopping, comprising:
determining a correlation maximum value detection threshold on the basis of a correlation peak value;
detecting one of correlation results, which exceeds the correlation maximum value detection threshold, as a correlation maximum value;
updating the correlation peak value to the detected correlation maximum value when the correlation maximum value is detected;
setting a period, where a correlation peak caused by an LO (Local Oscillator) spurious component may occur, to a first period, and setting a period, centering on a position where a distance from a correlation peak position is an integer multiple of a frequency hopping cycle, to a second period; and
monitoring presence or absence of a correlation result that exceeds the correlation maximum value detection threshold in the first and second periods, while not applying an erroneous detection threshold to the first period.

According to a third aspect of the present invention, there is provided a program for causing a computer to execute:
determining a correlation maximum value detection threshold on the basis of a correlation peak value;
detecting one of correlation results, which exceeds the correlation maximum value detection threshold, as a correlation maximum value;
updating the correlation peak value to the detected correlation maximum value when the correlation maximum value is detected;
setting a period, where a correlation peak caused by an LO (Local Oscillator) spurious component may occur, to a first period, and setting a period, centering on a position where a distance from a correlation peak position is an integer multiple of a frequency hopping cycle, to a second period; and
monitoring presence or absence of a correlation result that exceeds the correlation maximum value detection threshold in the first and second periods, while not applying an erroneous detection threshold to the first period.

The present invention provides the following advantage, but not restricted thereto. According to the preamble detection apparatus of the present invention, the preamble detection method, and the program, a preamble detection characteristic can be improved in the wireless communication system that performs frequency hopping.

PREFERRED MODES

Figure 1:
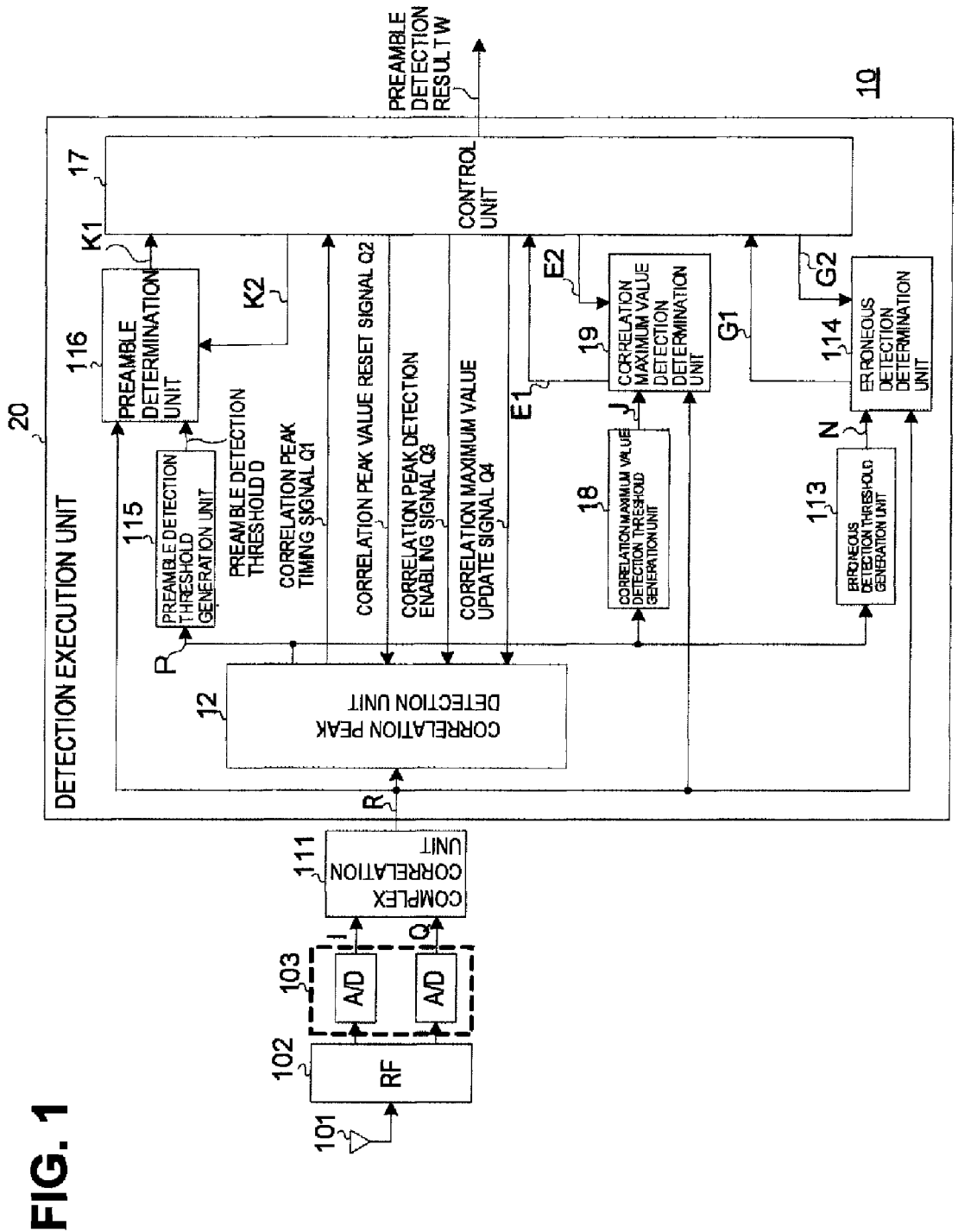
FIG. 1 is a block diagram showing a configuration of a preamble detection apparatus in an exemplary embodiment.

Preferably, a preamble detection apparatus in a first mode may be the preamble detection apparatus according to the first aspect.

Preferably, in a preamble detection apparatus in a second mode, the first period may be a window period centering on a position where a distance from the correlation peak position is an integer multiple of a symbol length other than the integer multiple of the frequency hopping cycle.

Preferably, in a preamble detection apparatus in a third mode, the second period may be a window period centering on the position where the distance from the correlation peak position is the integer multiple of the frequency hopping cycle.

Preferably, in a preamble detection apparatus in a fourth mode, the correlation maximum value detection threshold generation unit may set the correlation maximum value multiplied by a predetermined coefficient to the correlation maximum value detection threshold.

Preferably, in a preamble detection apparatus in a fifth mode, the predetermined coefficient may be not less than one.

Preferably, in a preamble detection apparatus in a sixth mode, when a first detected correlation peak is an undesired correlation peak, the preamble detection apparatus may detect that the correlation result which exceeds the correlation maximum value detection threshold is present in the first period or the second period, and update the first detected correlation peak by a correlation peak corresponding to the correlation result to start over preamble detection processing; and when the first detected correlation peak is a desired correlation peak, the preamble detection apparatus may detect that the correlation result which exceeds the correlation maximum value detection threshold is not present in the first period, and continue the preamble detection processing without updating the correlation peak.

Preferably, a preamble detection method in a seventh mode may be the preamble detection method according to the second aspect.

Preferably, a program in an eighth mode may be the program according to the third aspect.

The program may be recorded in a computer-readable recording medium.

The preamble detection apparatus of the present invention regards a detection (window) period of each certain symbol length starting from a detected correlation peak position as a period (first period) in which a correlation peak caused by an LO spurious component may occur. Then, the preamble detection apparatus excludes the first period from a monitor target period to which an erroneous detection threshold is applied. In this case, undetection of a desired wave caused by determination of the desired wave as having been erroneously detected can be prevented. Further, by excluding a minimum necessary period from the monitor target period to which the erroneous detection threshold is applied, the need for relaxing (or increasing) the erroneous detection threshold is eliminated. Thus, erroneous detection of a signal of a wave other than the desired wave can also be prevented.

Further, the first period and the second period (centering on the position in which the distance from the detected peak position is the integer multiple of the frequency hopping cycle) are monitored, using the correlation maximum value detection threshold. With this arrangement, when a desired correlation peak occurs in the first period or the second period after detection of an undesired correlation peak, undetection of the desired correlation peak can be prevented. When a correlation peak caused by an LO spurious component that slightly exceeds a desired correlation peak occurs in the first period after detection of the desired correlation peak, updating of the correlation peak caused by the LO spurious component as a new correlation peak and execution of preamble detection at an erroneous timing can be prevented.

Consequently, according to the preamble detection apparatus of the present invention, a preamble detection characteristic in a wireless communication system that performs frequency hopping can be improved.

Exemplary Embodiment

Figure 9:
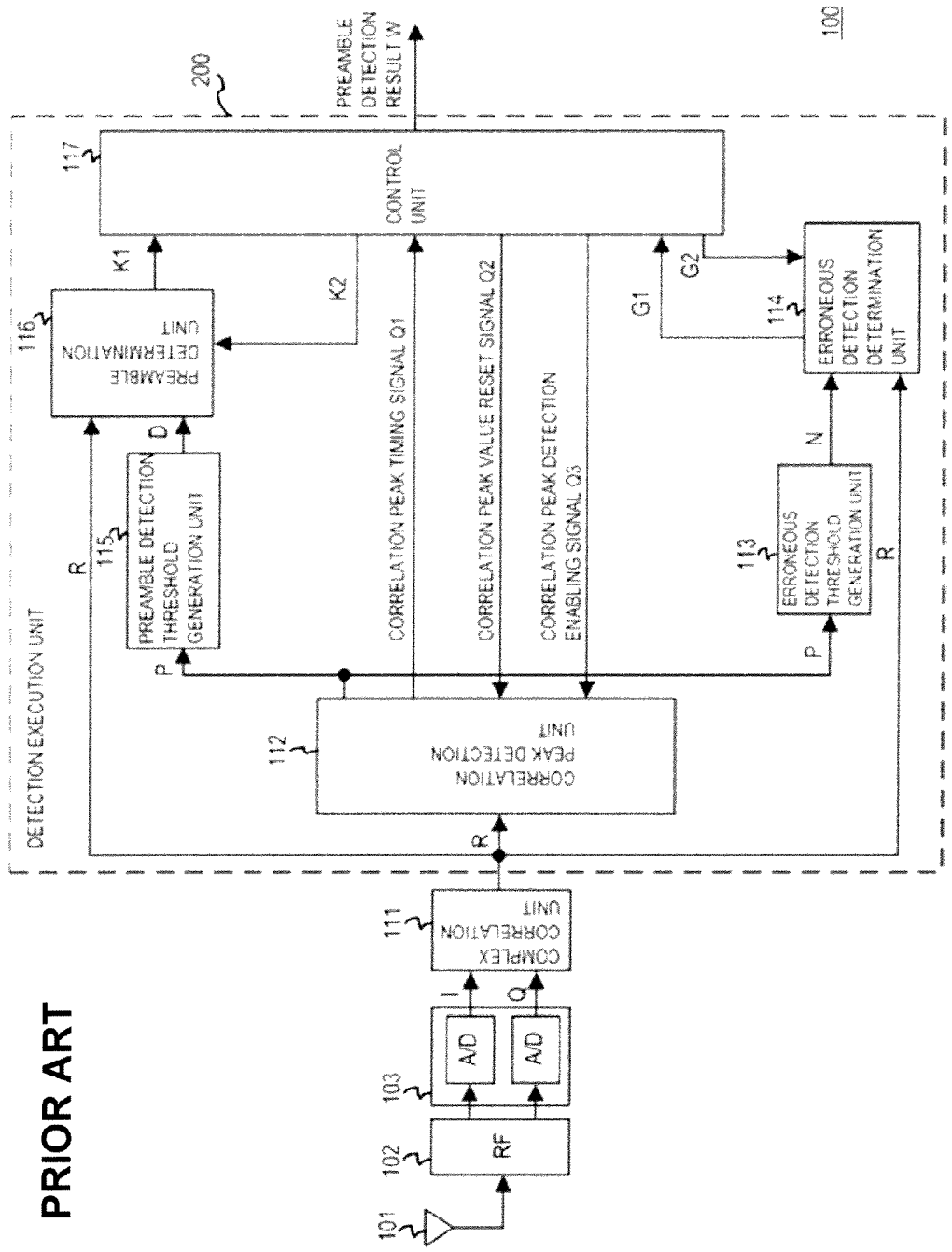
FIG. 9 is a block diagram showing a configuration of a preamble detection apparatus described in Patent Document 1.

A preamble detection apparatus according to an exemplary embodiment will be described with reference to drawings. FIG. 1 is a block diagram showing a configuration of a preamble detection apparatus 10 according to this exemplary embodiment. Same reference numerals are assigned to components of the preamble detection apparatus 10 that are the same as those of a preamble detection apparatus 100 (in FIG. 9) described in Patent Document 1, thereby omitting description of the same components. Referring to FIG. 1, the preamble detection apparatus 10 includes a correlation maximum value detection threshold generation unit 18 and a correlation maximum value detection determination unit 19, in addition to the configuration of the preamble detection apparatus 100 (in FIG. 9) described in Patent Document 1.

The correlation maximum value detection threshold generation unit 18 receives a correlation peak value P output by a correlation peak detection unit 12, and outputs a correlation maximum value detection threshold J to the correlation maximum value detection determination unit. The correlation maximum value detection threshold J is a result obtained by multiplying the correlation peak value P by a coefficient δ. The coefficient δ is set to be in a range of $1 \leqq \delta$. Based on a system simulation, the coefficient δ is determined to be a minimum value by which a preamble detection failure caused by a correlation maximum value detection failure does not occur, or an influence of the preamble detection failure can be ignored. In this exemplary embodiment, the coefficient δ is set to ten, for example.

The correlation maximum value detection determination unit 19 receives the correlation maximum value detection threshold J output from the correlation maximum value detection threshold generation unit 18, a correlation result R output from a complex correlation unit, and a correlation maximum value detection determination enabling signal E2 output from a control unit 17, and outputs a correlation maximum value detection determination result E1 to the control unit 17.

Figure 2:
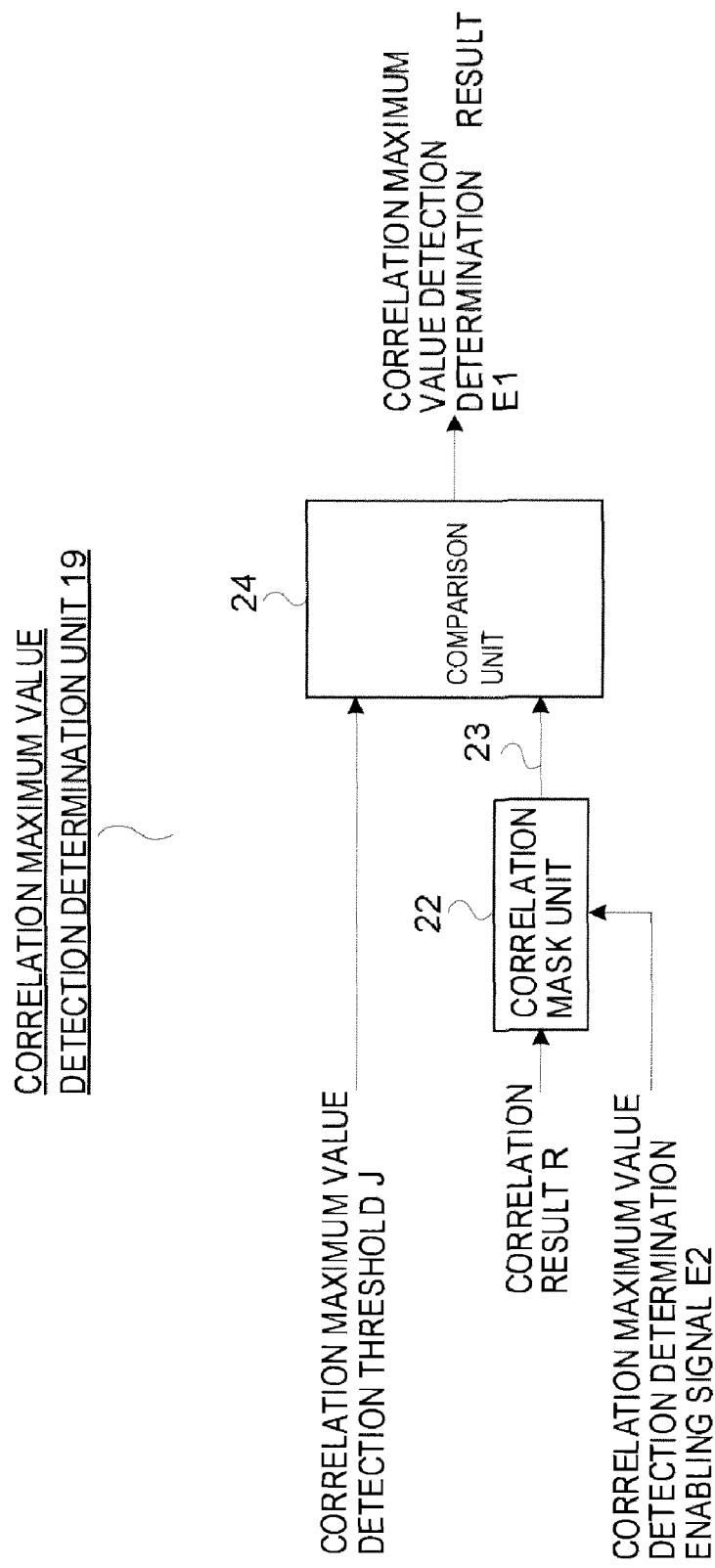
FIG. 2 is a block diagram showing a configuration of a correlation maximum value detection determination unit in the preamble detection apparatus in the exemplary embodiment.

FIG. 2 is a block diagram showing a configuration of the correlation maximum value detection determination unit 19 in the preamble detection apparatus 10 in this exemplary embodiment. Referring to FIG. 2, the correlation maximum value detection determination unit 19 includes a correlation mask unit 22 and a comparison unit 24.

The correlation mask unit 22 receives the correlation maximum value detection determination enabling signal E2 and the correlation result R, and outputs a correlation mask unit output 23 to a comparison unit 24. The comparison unit 24 receives the correlation mask unit output 23 and the correlation maximum value detection threshold J and outputs the correlation maximum value detection determination result E1 to the control unit 17.

The correlation peak detection unit 12 receives the correlation result R output from the complex correlation unit 111 and a correlation peak detection enabling signal Q3, a correlation peak value reset signal Q2, and a correlation maximum value update signal Q4 output from the control unit 17, and outputs a correlation peak timing signal Q1 to the control unit 17. The correlation peak detection unit 12 outputs the correlation peak value P to a preamble detection threshold generation unit 115, the correlation maximum value detection threshold generation unit 18, and an erroneous detection threshold generation unit 113.

Figure 3:
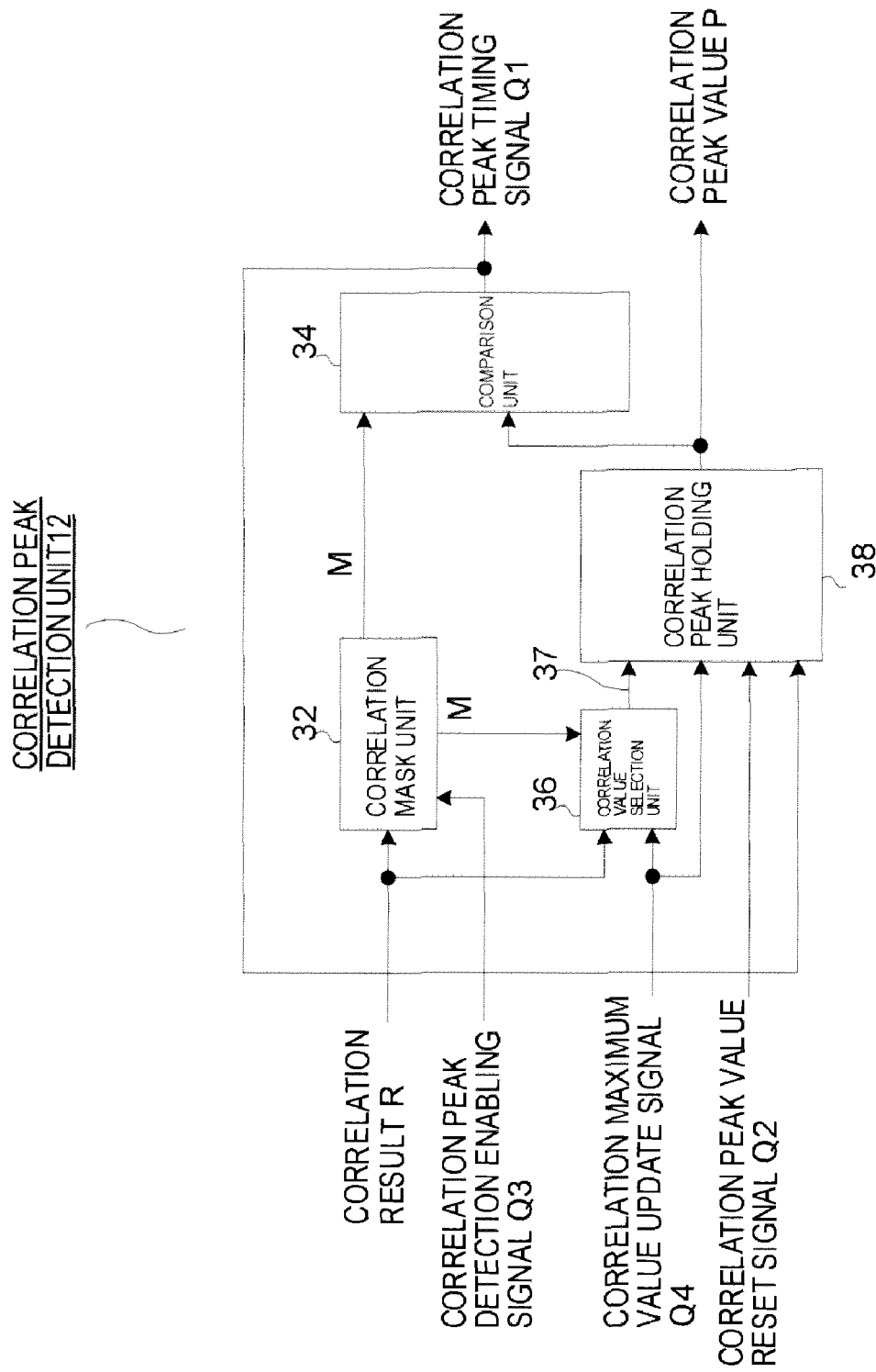
FIG. 3 is a block diagram showing a configuration of a correlation peak detection unit in the preamble detection apparatus in the exemplary embodiment.

FIG. 3 is a block diagram showing a configuration of the correlation peak detection unit 12 in the preamble detection apparatus 10 in this exemplary embodiment. Referring to FIG. 3, the correlation peak detection unit 12 includes a correlation mask unit 32, a comparison unit 34, a correlation value selection unit 36, and a correlation peak holding unit 38.

The correlation mask unit 32 receives the correlation result R and the correlation peak detection enabling signal Q3, and outputs a correlation mask unit output M to the correlation value selection unit 36 and the comparison unit 34. During a period where the correlation peak detection enabling signal Q3 is active, the correlation mask unit 32 outputs the received correlation result R without alternation, without performing mask processing. During a period where the correlation peak detection enabling signal Q3 is not active, the correlation mask unit 32 performs the mask processing of outputting "0" for the received correlation unit R.

The correlation value selection unit 36 receives the correlation mask unit output M, the correlation result R, and the correlation maximum value update signal Q4, and outputs a correlation value selection unit output 37 to the correlation peak holding unit 38. When the correlation maximum value update signal Q4 is active, the correlation value selection unit 36 outputs the correlation result R as the correlation value selection unit output 37. When the correlation maximum value update signal Q4 is not active, the correlation value selection unit 36 outputs the correlation mask unit output M as the correlation value selection unit output 37.

The correlation peak holding unit 38 receives the correlation value selection unit output 37, the correlation maximum value update signal Q4, the correlation peak value reset signal Q2, and the correlation peak timing signal Q1, and outputs the correlation peak value P. The correlation peak holding unit 38 holds the correlation peak value P while updating the correlation peak value P. Specifically, when the correlation maximum value update signal Q4 becomes active, or when the correlation peak timing signal Q1 becomes active, the correlation peak holding unit 38 updates the held correlation peak value P to the correlation value selection unit output 37. When the correlation peak value reset signal Q2 from the control unit 17 becomes active, the correlation peak holding unit 38 resets the correlation peak value P to an initial value zero. The correlation maximum value update signal Q4 does not become active simultaneously with the correlation peak timing signal Q1 or the correlation peak value reset signal Q2. Though the correlation peak timing signal Q1 and the correlation peak value reset signal Q2 may simultaneously become active, the correlation peak timing signal Q1 is always given priority.

The comparison unit 34 receives the correlation mask unit output M and the correlation peak value P, and outputs the correlation peak timing signal Q1 to the correlation peak holding unit 38 and the control unit 17. The correlation peak value P (of which the initial value is zero) is held in the correlation peak holding unit 38. The comparison unit 34 compares the correlation peak value P held in the correlation peak holding unit 38 with the correlation mask unit output M. When the correlation mask unit output M is larger than the correlation peak value P, the comparison unit 34 sets the correlation peak timing signal Q1 to "1" indicating a timing at which a new correlation peak has been detected. On the other hand, when the correlation mask unit output M is not larger than the correlation peak value P, the comparison unit 34 sets the correlation peak timing signal Q1 to "0" indicating that no new correlation peak has not been detected. That is, when the correlation peak value P is updated in a period where the correlation peak detection enabling signal Q3 is active, the correlation peak timing signal Q1 assumes "1." On the other hand, when the correlation peak value P is updated according to the correlation maximum value update signal Q4, the correlation mask unit output M is masked to zero. Thus, the correlation peak timing signal Q1 remains at "0."

The control unit 17 outputs a preamble detection result W. The control unit 17 outputs the correlation peak detection enabling signal Q3 to the correlation peak detection unit 12 when examining whether or not to update the correlation peak value P that is located at a symbol timing estimating position. When the correlation peak value P has been updated, the control unit receives the correlation peak timing signal Q1 from the correlation peak detection unit 12 at a timing when the correlation peak value P has been updated.

When making determination of erroneous detection of the correlation peak value P, the control unit 17 outputs an erroneous detection determination enabling signal G2 to an erroneous detection determination unit 114, and receives an erroneous detection determination result G1 indicating an erroneous detection occurrence status from the erroneous detection determination unit 114. When the erroneous detection determination result G1 indicates the erroneous detection, the control unit 17 outputs the correlation peak value reset signal Q2 to the correlation peak detection unit 12 to reset the correlation peak value P.

When making determination of correlation maximum value detection that monitors occurrence of a correlation value larger than the correlation peak value P, the control unit 17 outputs the correlation maximum value detection determination enabling signal E2 to the correlation maximum value detection determination unit 19, and receives the correlation maximum value detection determination result E1 indicating an occurrence status of a correlation value larger than the correlation maximum value detection threshold J. When the control unit 17 receives the correlation maximum value detection determination result E1, the control unit 17 outputs the correlation maximum value update signal Q4 to the correlation peak detection unit 12.

When making preamble determination that detects a correlation value which is produced in a certain cycle from the correlation peak value P, the control unit 17 outputs a preamble determination enabling signal K2 to a preamble determination unit 116, and receives a preamble determination result K1 indicating a success or a failure of the preamble determination from the preamble determination unit 116. When the preamble determination has failed, the control unit 17 outputs the correlation peak value reset signal Q2 to the correlation peak detection unit 12 to reset the correlation peak value P. When a predetermined number of times of the preamble determinations have succeeded, the control unit 17 regards preamble detection has succeeded, and outputs the preamble determination result W as a preamble detection result.

Figure 4:
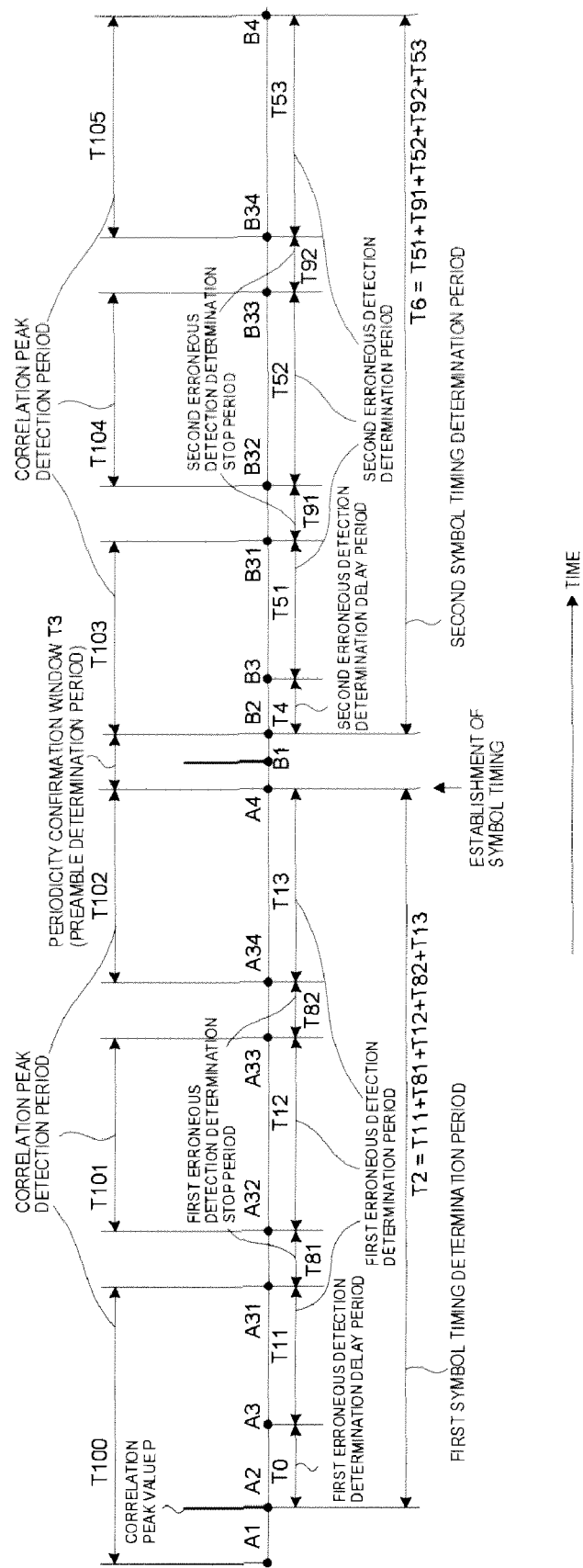
FIG. 4 is a diagram showing an operating period of a preamble detection method in the preamble detection apparatus in the exemplary embodiment.

FIG. 4 is a diagram showing an operating period of a preamble detection method by the preamble detection apparatus 10 in this exemplary embodiment. Referring to FIG. 4, the operating period of the preamble detection method determined by the control unit 17 will be described.

Figure 10:
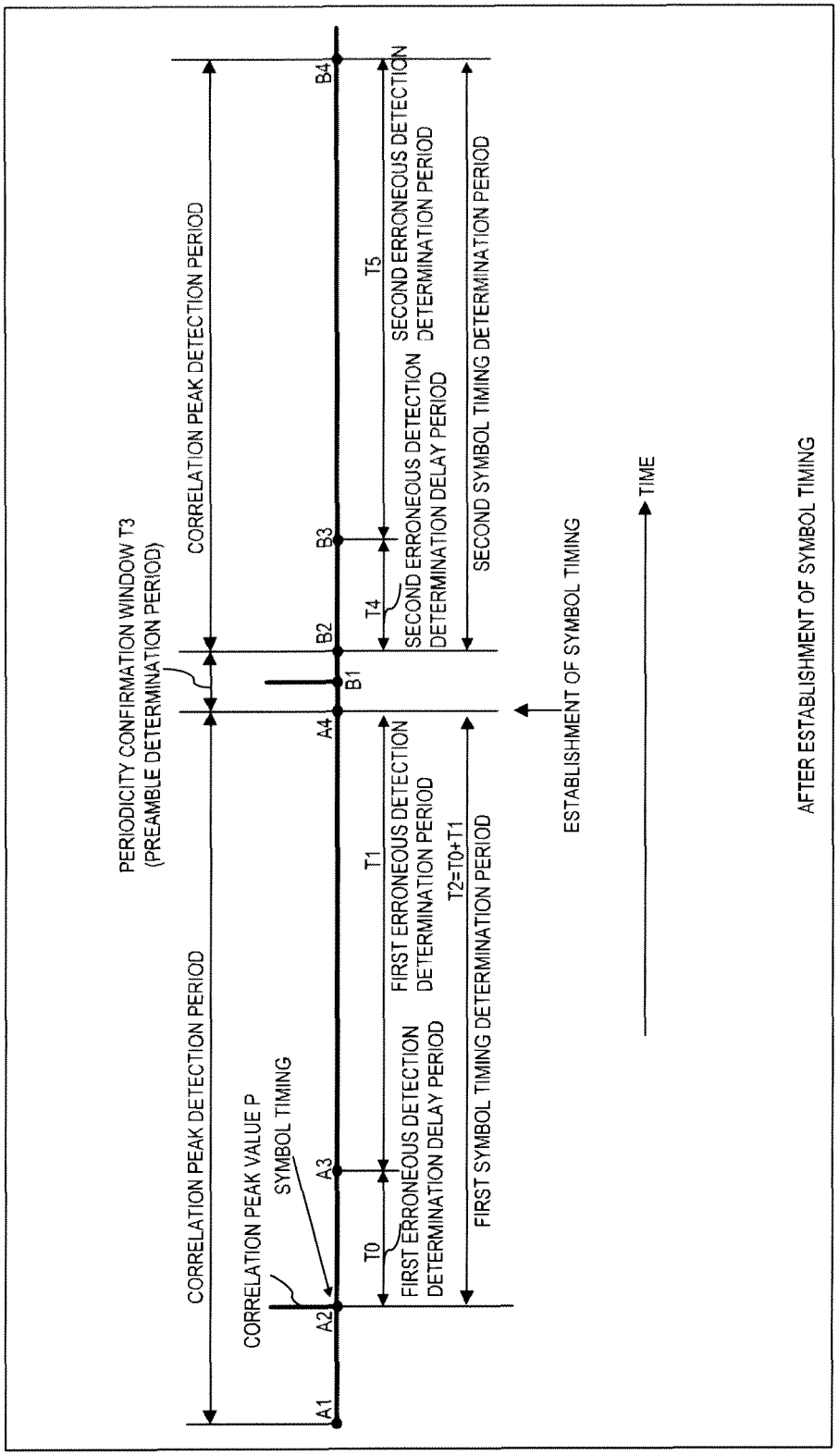
FIG. 10 shows an operating period of a preamble detection method described in Patent Document 1.
Figure 11:
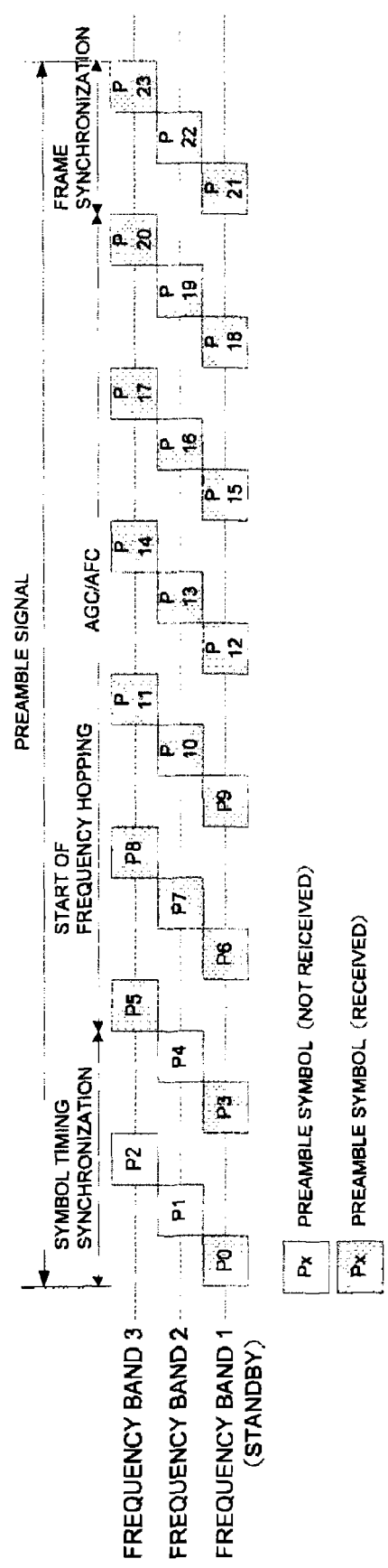
FIG. 11 shows an example of a preamble in MB-OFDM.
Figure 12:
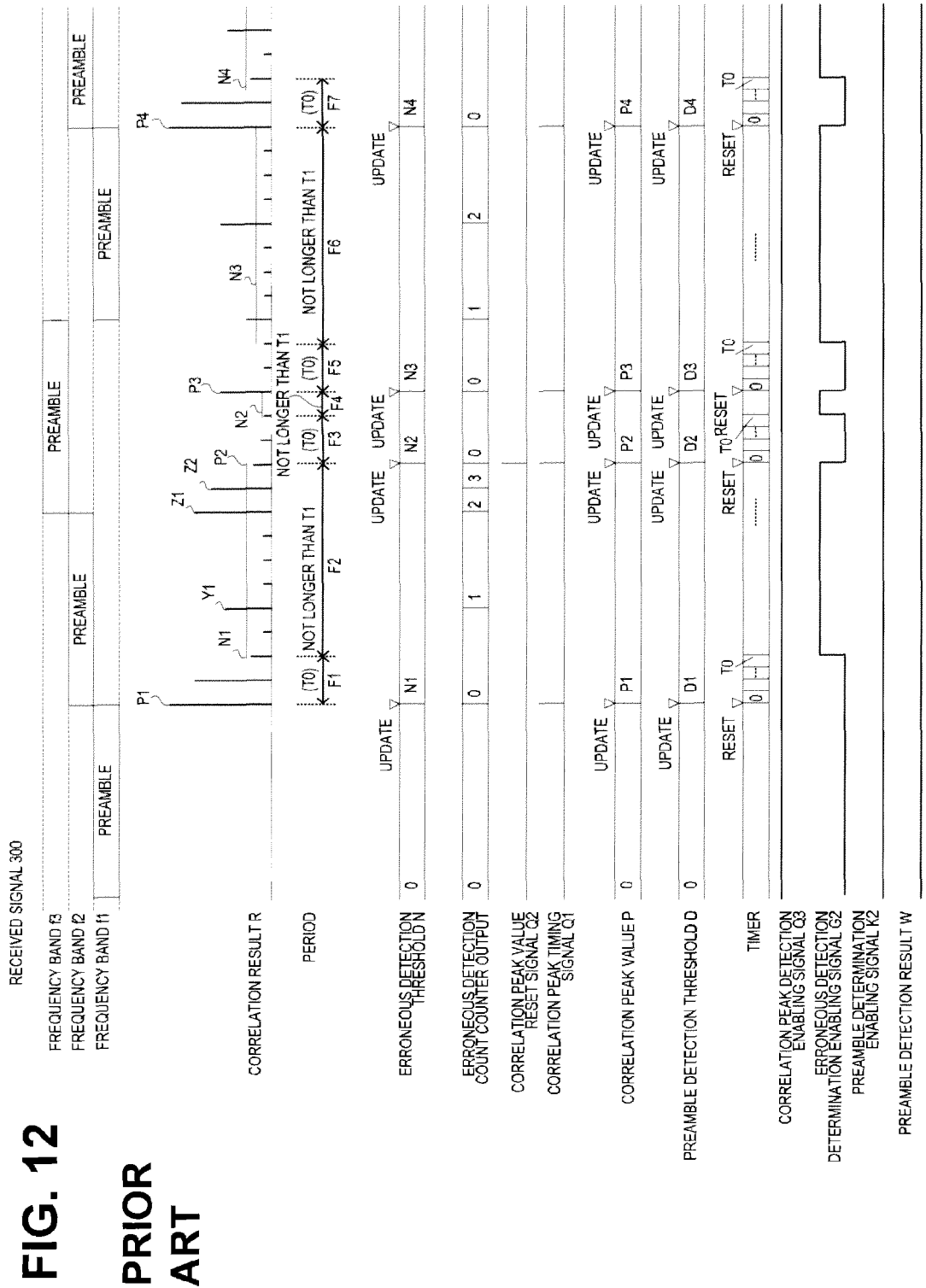
FIG. 12 is a diagram for explaining a problem of technique described in Patent Document 1.
Figure 13:
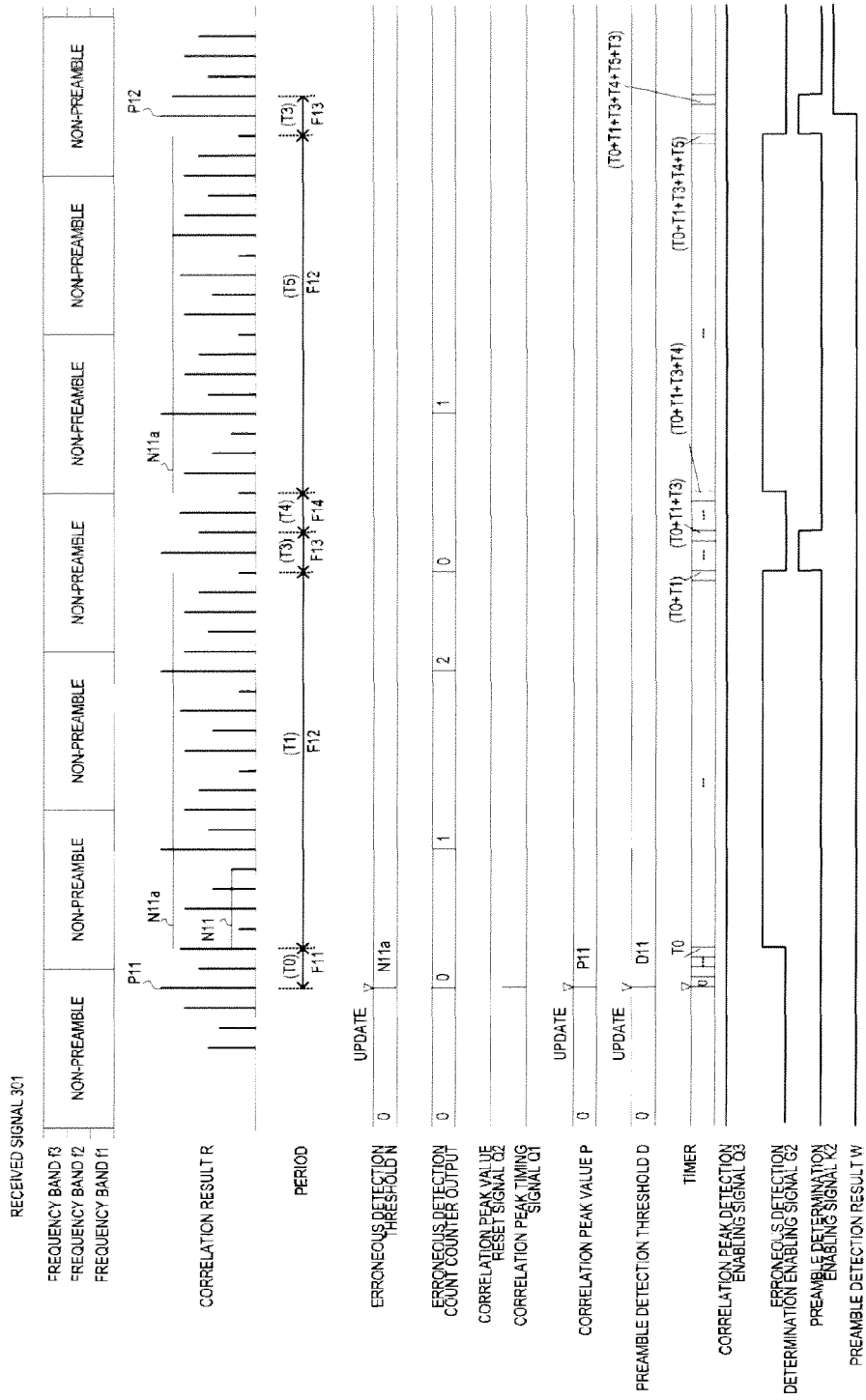
FIG. 13 is a diagram for explaining a problem of the technique described in Patent Document 1.

A difference from the operating period (in FIG. 10) of the preamble detection apparatus 100 described in Patent Document 1 is that erroneous determination stop periods are provided within an erroneous detection determination period to divide the erroneous detection determination period, and a correlation peak detection period is divided. Specifically, first erroneous detection determination stop periods T81 and T82 are provided in a period from reference symbol A3 to reference symbol A4 in FIG. 4 corresponding to a first erroneous detection determination period T1 in FIG. 10, thereby dividing the first erroneous detection determination period into periods T11 to T13. Second erroneous detection determination stop periods T91 and T92 are provided in a period from reference symbol B3 to reference symbol B4 in FIG. 4 corresponding to a second erroneous detection determination period T5 in FIG. 10, thereby dividing the second erroneous detection determination period into periods T51 to T53. A correlation peak detection period from reference symbol A1 to reference symbol A4 in FIG. 10 is divided into periods T100 to T102 in FIG. 4, and a correlation peak detection period from reference symbol B2 to symbol B4 in FIG. 10 is divided into periods T103 to T105 in FIG. 4. An interval between the divided correlation peak detection periods is equal to the erroneous detection determination stop period. The interval between the periods T100 and T101 is equal to the period T81. The interval between the periods T101 and T102 is equal to the period T82. The interval between the periods T103 and T104 is equal to the period T91. The interval between the periods T104 and T105 is equal to the period T92.

Periods other than the erroneous detection determination periods, the erroneous detection determination stop periods, and the correlation peak detection periods are the same as those in the operating period of the preamble detection apparatus 100 described in Patent Document 1.

Figure 5:
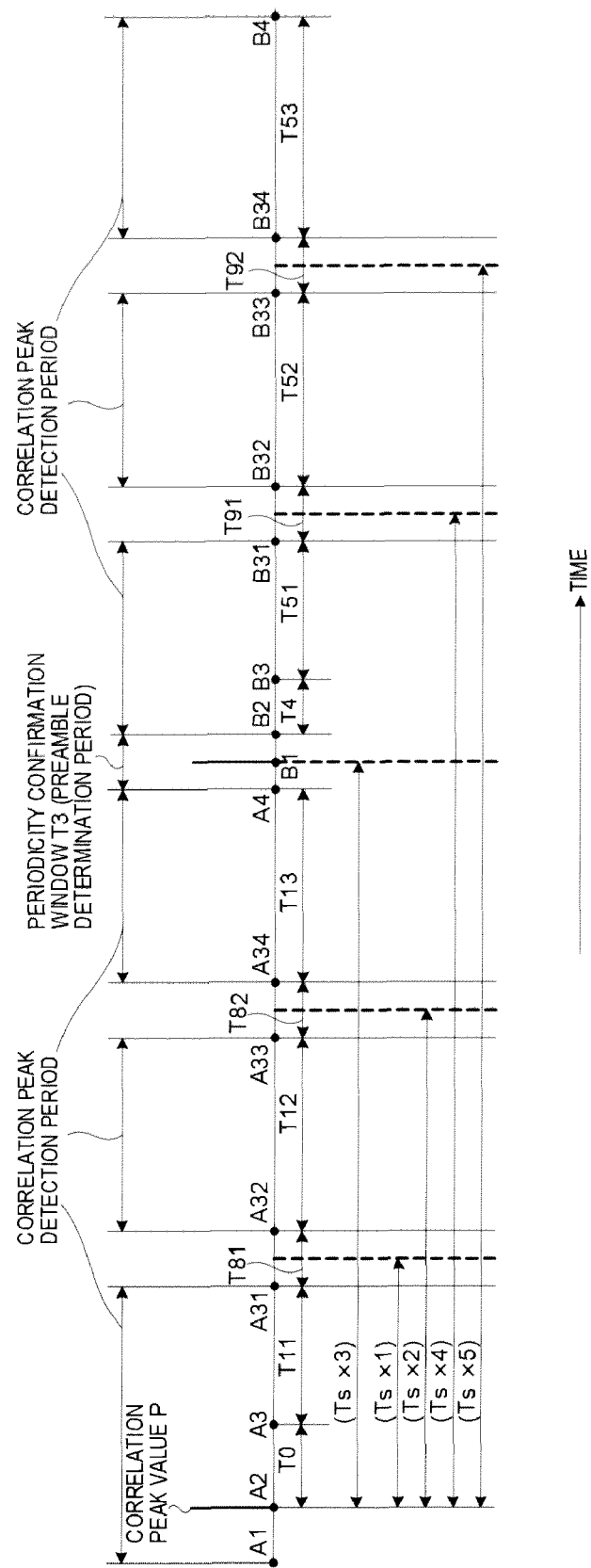
FIG. 5 is a diagram showing a relationship between a correlation peak value P and each of erroneous detection determination stop periods in the preamble detection apparatus in the exemplary embodiment.

FIG. 5 is a diagram showing a relationship between the correlation peak value P and each of the erroneous detection determination stop periods in the preamble detection apparatus 10 in this exemplary embodiment. Referring to FIG. 5, a method of determining the first and second erroneous detection determination stop periods T81, T82, T91, and T92 will be described.

A position where a correlation peak caused by an LO spurious component occurs is determined by a frequency hopping pattern, and is located at every position where a distance from a preamble correlation peak in a standby frequency hand is an integer multiple of a symbol length other than an integer multiple of a frequency hopping cycle. Using this property, the control unit 17 opens a window centering on every position where a distance from the correlation peak detected first is the integer multiple of the symbol length other than the integer multiple of the frequency hopping cycle, and sets the period of the window to the erroneous detection determination stop period.

FIG. 5 shows an operating period when the frequency hopping cycle is set to 3. The frequency hopping cycle has the frequency hopping pattern in which frequency hopping is performed in the order of a frequency f1, a frequency f2, a frequency f3, the frequency f1, and so on. The first erroneous detection determination stop period T81 is set to a period centering on the position where the distance from a correlation peak P is a symbol length Ts×1, and the first erroneous detection determination stop period T82 is set to a period centering on the position where the distance from the correlation peak P is the symbol length Ts×2. A period centering on the position where the distance from the correlation peak P is the symbol length Ts×3 or Ts×(frequency hopping cycle)×1 is a periodicity confirmation window T3. Thus, the position of the symbol length Ts×3 is not included as the position where a correlation peak caused by an LO spurious component occurs.

The second erroneous detection determination stop period is also set in the same manner as the first erroneous detection determination stop period. That is, the second erroneous detection determination stop period T91 is set to a period centering on the position where the distance from the correlation peak P is the symbol length Ts×4, and the second erroneous detection determination stop period T92 is set to a period centering on the position where the distance from the correlation peak P is the symbol length Ts×5.

Specific and preferable values of the periods T81, T82, T91, and T92 are selected according to a communication method and a reception environment. In an MB-OFDM system, for example, an erroneous detection determination stop period is set to 74 T, where 1 T=1/528 MHz.

The erroneous detection determination stop periods are determined as described above. Each erroneous detection determination stop period is a period where erroneous detection determination and correlation peak detection are stopped, and determination of correlation maximum value detection, which will be described later, is performed.

Figure 6A:
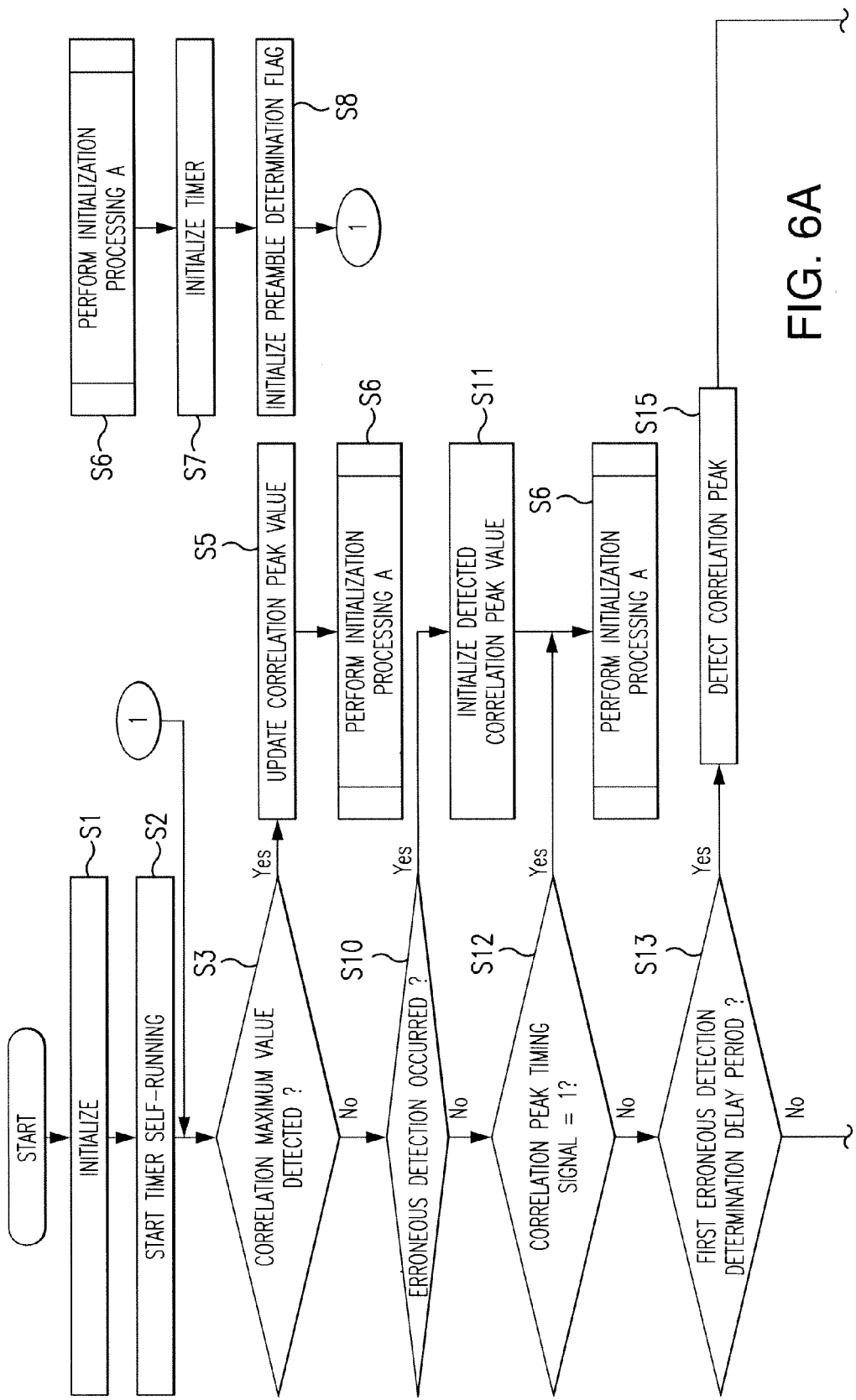
FIGS. 6A-6C are a flowchart showing an operation of a control unit in the preamble detection apparatus in the exemplary embodiment.
Figure 6B:
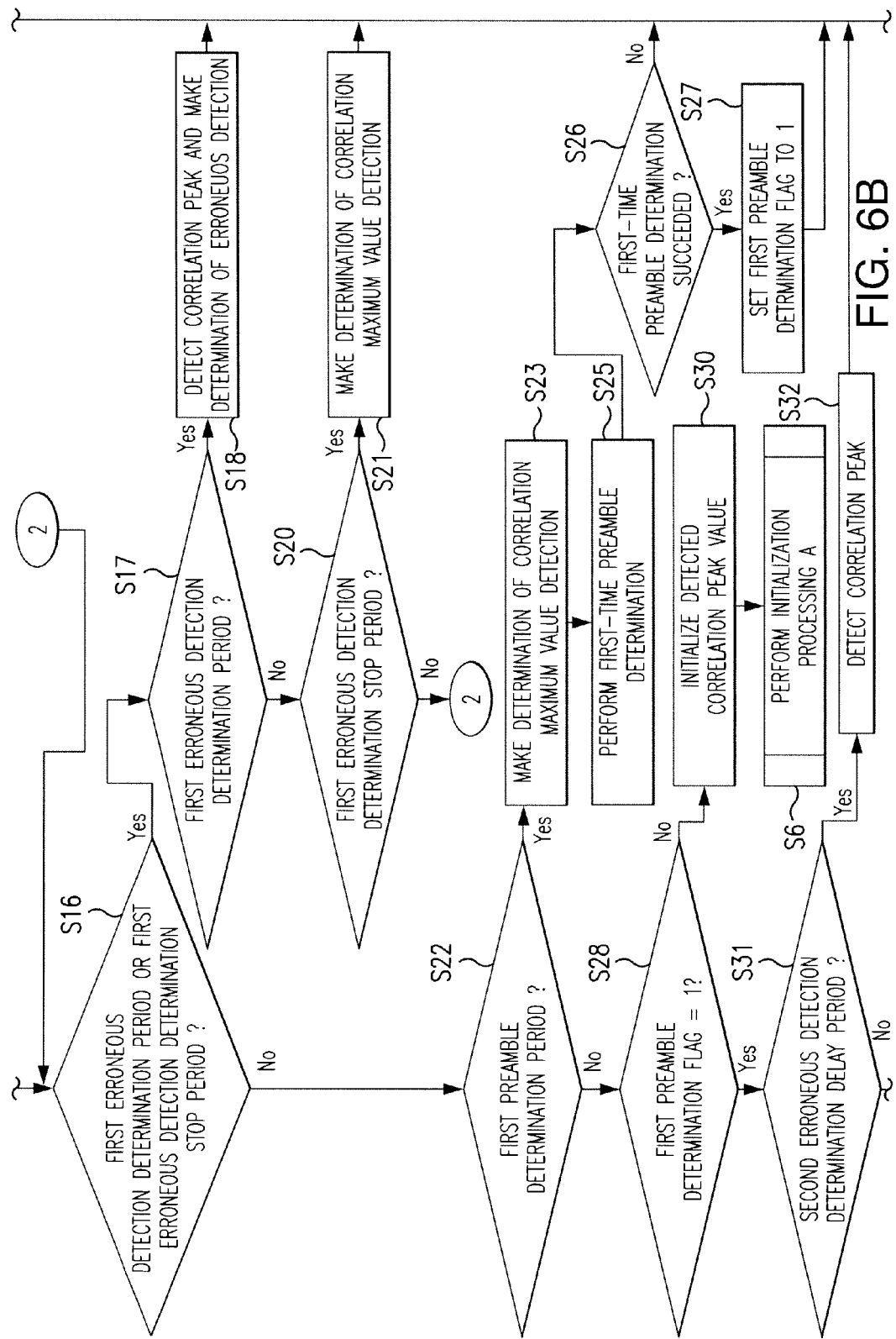
Figure 6C:
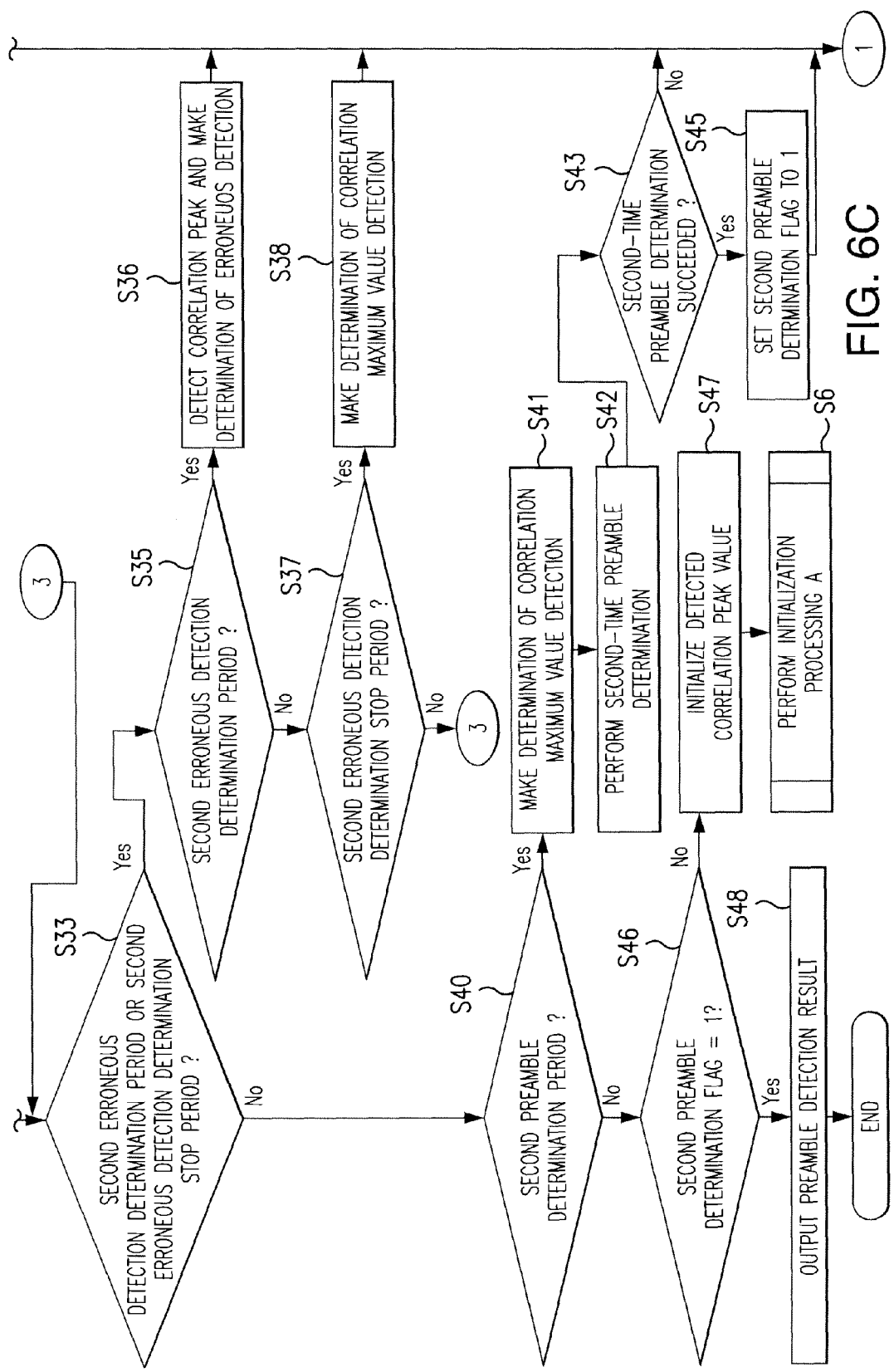

FIGS. 6A-6C are a flowchart showing an operation of the control unit 17 in the preamble detection apparatus 10 in this exemplary embodiment. An operation of the preamble detection apparatus 10 described in FIG. 1 will be described, with reference to FIGS. 6A-6C.

A sequence of processing of obtaining the correlation result R, which is an output of the complex correlation unit 111 from a received signal received through the antenna 101 are is same as that using the technique described in Patent Document 1. Thus, description of the processing will be omitted.

Next, the detection execution unit 20 starts preamble detection using the correction result R sequentially obtained from the complex correlation unit 111. When starting the preamble detection, the detection execution unit 20 initializes each functional block (in step S1).

Specifically, the control unit 17 initializes the preamble determination enabling signal K2, the erroneous detection determination enabling signal 62, the correlation maximum value detection determination enabling signal E2, the preamble detection result W, and two preamble determination flags that will be described later to "0," and initializes a timer (not shown) provided inside the control unit 17 to "0." The control unit 17 includes the two preamble determination flags each indicating a result of periodicity confirmation by the preamble determination unit 16. These two preamble determination flags correspond to results of two-time periodicity confirmation by the preamble determination unit 116. When the preamble determination result K1 is active, these two preamble determination flags are activated.

Next, the correlation maximum value detection determination unit 19 initializes the correlation maximum value determination result E1 to "0."

Next, the correlation maximum value detection threshold generation unit 18, the erroneous detection threshold generation unit 113, and the preamble threshold generation unit 115 respectively initialize the correlation maximum value detection threshold J, an error detection threshold N, and a preamble detection threshold D to "0".

Further, the erroneous detection determination unit 114 and the correlation peak detection unit 12 are also initialized. Since these initialization processing is the same as that using the technique described in Patent Document 1, description of these initialization processing will be omitted.

After each functional block has been initialized (in step S1), the control unit 17 activates the correlation peak determination enabling signal Q3 to start correlation peak detection processing by the correlation peak detection unit 12. The timer (not shown) in the control unit 17 starts self-running (in step S2).

When the current correlation result R is output from the complex correlation unit 111 after the start of the timer (in step S2), the control unit 17 checks the state of the correlation maximum value detection determination result E1 based on the immediately preceding correlation result R (in step S3). When the correlation maximum value detection determination result E1 is "1," it is determined that a correlation maximum value has been detected (Yes in step S3). Then, the control unit 17 sets the correlation maximum value update signal Q4 to "1," and causes the correlation peak detection unit 12 to update the correlation peak value P to the correlation result R or update the correlation peak value P to the detected correlation maximum value (in step S5), and performs initialization processing A (in step S6).

The initialization processing A (in step S6) is the same as that using the technique described in Patent Document 1, and is constituted from initialization of the timer (in step S7) in which the timer is initialized to "0," and initialization of the two preamble determination flags (in step S8) in which the two preamble determination flags are initialized to "0."

The control unit 17 returns the procedure to step S3 after the initialization processing A (in step S6), and starts over the processing again from a point of time when reset has been made, as shown in FIG. 6A.

On the other hand, when the result of check indicates "0" in step S3, it is determined that the correlation maximum value has not been detected (No in step S3), and the procedure proceeds to step S10. Since the correlation maximum value detection determination result E1 indicates "0" immediately after the initialization, the procedure proceeds from step S3 to step S10.

The control unit 17 checks the state of the erroneous detection determination result G1 based on the immediately preceding correlation result R (in step S10). When the erroneous detection determination result G1 indicates "1," it is determined that erroneous detection has occurred (Yes in step S10). Then, the control unit 17 sets the correlation peak value reset signal Q2 to one, and causes the correlation peak detection unit 12 to initialize the correlation peak value P (in step S11), and performs the initialization processing A (in step S6). Then, the control unit 17 returns the procedure to step S3 to start over the processing from a point of time when the reset has been made.

On the other hand, when the erroneous determination result G1 indicates "0," it is determined that erroneous detection has not occurred (No in step S10), and the procedure proceeds to step S12. Since the erroneous detection determination result G1 indicates "0" immediately after the initialization, the procedure proceeds from step S10 to step S12.

The control unit 17 checks whether or not the immediately preceding correlation result R has been detected as the correlation peak value P (in step S12). Specifically, when the correlation peak timing signal Q1 is active or indicates "1" (Yes in step S12), it is determined that the immediately preceding correlation result R has been detected as the correlation peak value P in the correlation peak detection processing, or the correlation peak value P has been updated. Then, the control unit 17 performs the initialization processing A (in step S6), and returns the procedure to step S3, with the updated correlation peak value P used as a starting point.

When the correlation peak timing signal Q1 indicates "0" in step S12 (No in step S12), it is determined that the immediately preceding correlation result R has not been detected as the correlation peak value P, and the procedure proceeds to step S13. Since the correlation peak timing signal Q1 indicates "0" immediately after the initialization, the procedure proceeds from step S12 to step S13.

When the timing of the current correlation result is not positioned in the first erroneous detection determination delay period T0 (in which the value of the timer is not larger than T0) on the basis of the correlation peak value P being held by the correlation peak detection unit 12 (No in step S13), the procedure proceeds to step S16. When the timing of the current correlation result is positioned in the first erroneous detection determination delay period T0 (in which the value of the timer is not larger than T0) on the basis of the correlation peak value P being held by the correlation peak detection unit 12 (Yes in step S13), the control unit 17 holds the correlation peak detection enabling signal Q3 in an active state, and causes the correlation peak detection processing by the correlation peak detection unit 12 to be continued (in step S15).

In this period, the control unit 17 holds the erroneous detection determination enabling signal G2, the correlation maximum value detection determination enabling signal E2, and the preamble determination enabling signal K2 that remain at "0," and forbids detection of erroneous detection determination, detection of correlation maximum value detection, and preamble determination.

When the current correlation result is larger than the correlation peak value P being held by the correlation peak detection unit 12 as a result of the correlation peak detection processing (in step S15), the correlation peak value P is updated, and the correlation peak timing signal Q1 that will be output to the control unit 17 becomes active. On the other hand, when the current correlation result is not larger than the correlation peak value P being held, the correlation peak value P is not updated, and the correlation peak timing signal Q1 does not become active. After the correlation peak detection processing (in step S15), the procedure returns to step S3 in order to make determination based on a subsequent correlation result.

When the timing of the current correlation result is in the first erroneous detection determination period or the first erroneous determination stop period (the value of the timer is larger than T0 and is not larger than T2) after the elapse of the first erroneous detection determination delay period T0 (Yes in step S16), the control unit 17 starts erroneous detection determination processing or correlation maximum value detection determination processing.

When it is determined that the timing of the current correlation result is in the first erroneous detection determination period T11 (in which the value of the timer is larger than T0 and is not larger than T0+T11), T12 (in which the value of the timer is larger than T0+T11+T81 and not larger than T0+T11+T81+T12), or T13 (in which the value of the timer is larger than T0+T11+T81+T12+T82 and is not larger than T2) (Yes in step S17), the control unit 17 causes the correlation peak detection unit 12 to continue correlation peak detection and causes the erroneous detection determination unit 114 to make determination of erroneous detection (in step S18). Then, the procedure returns to step S3. Determination of erroneous detection (in step S18) by the erroneous detection determination unit 114 is the same as that using the technique described in Patent Document 1. Thus, detailed description of determination of erroneous detection will be omitted. When the current correlation result R is larger than the correlation peak value P being held, the correlation peak detection unit 12 updates the correlation peak value P, and activates the correlation peak timing signal Q1 that will be output to the control unit 17. When the current correlation result is not larger than the correlation peak value P being held, the correlation peak detection unit 12 does not update the correlation peak value P, and does not activate the correlation peak timing signal Q1 (in step S18).

When it is determined that the timing of the current correlation result is not in the first erroneous detection determination delay period (No in step S17), the procedure proceeds to processing of determining whether or not the timing is in the first erroneous detection determination stop period or not (in step S20).

When it is determined that the timing of the current correlation result is in the first erroneous detection determination stop period T81 (in which the value of the timer is larger than T0+T11 and is not larger than T0+T11+T81) or T82 (in which the value of the timer is larger than T0+T11+T81+T12 and not larger than T0+T11+T81+T12+T82), (Yes in step S20), the control unit 17 holds the correlation peak detection enabling signal Q3 and the erroneous detection determination enabling signal G2 at "0," forbids the correlation peak detection processing by the correlation peak detection unit 12 and the erroneous detection determination processing by the erroneous detection determination unit 114, and activates the correlation maximum value detection determination enabling signal E2, thereby causing the correlation maximum value detection determination unit 19 to make determination of correlation maximum value detection (in step S21), and the procedure returns to step S3.

The correlation maximum value detection determination unit 19 determines whether or not the current correlation result is larger than the correlation maximum value detection threshold J (in step S21). When the current correlation result is larger than the correlation maximum value detection threshold J, the correlation maximum value detection determination unit 19 activates the correlation maximum value detection determination result E1. When the current correlation result is not larger than the correlation maximum value detection threshold J, the correlation maximum value detection determination unit 19 does not activate the correlation maximum value detection determination result E1.

When it is determined that the timing of the current correlation result is not in the first erroneous detection determination stop period (No in step S20), the procedure returns to step S16, and the processing when the timing of the current correlation result is in the first erroneous detection determination period or the first erroneous detection determination stop period after the first erroneous detection determination delay period T0 (in which the value of the timer is larger than T0 and not larger than T2) is repeated.

Assume that it is determined that the timing of the current correlation result is after the first erroneous detection determination delay period T0, and after the first erroneous detection determination periods or after the first erroneous detection determination stop periods (in which the value of the timer is larger than T2) (No in step S16). That is, when the correlation peak value P is not updated in the first erroneous detection delay period T0 and the first erroneous detection determination periods T11, T12, and T13 on the basis of the held correlation peak value P, when erroneous detection is not determined in the first erroneous detection determination periods T11, T12, and T13, and when correlation maximum value detection is not determined in the first erroneous detection stop periods T81 and T82, the timing of the correlation result R at which the correlation peak value P has been held is determined to be a symbol timing.

After the symbol timing has been established, the control unit 17 sets the correlation peak detection enabling signal Q3 to "0," which indicates a state where correlation peak detection is forbidden, sets the correlation maximum value detection determination enabling signal E2 to "1," which indicates a state where correlation maximum value detection determination is enabled, sets the preamble determination enabling signal K2 to "1," which indicates a state where preamble determination is enabled, and sets the erroneous detection determination enabling signal G2 to "0," which indicates a state where erroneous detection determination is forbidden. The control unit 17 determines whether or not the timing is in a first preamble determination period in which the correlation maximum value detection determination by the correlation maximum value detection determination unit 19 and first periodicity confirmation by the preamble determination unit 116 are performed (in step S22). When the timing of the current correlation result is not in the first preamble determination period (No in step S22), the procedure proceeds to step S28.

When the timing of the current correlation result is in the first preamble determination period (Yes in step S22), the correlation maximum value detection determination by the correlation maximum value detection determination unit 19 is performed (in step S23). Since processing in the step S23 is the same as that in step S21, description of the step S23 will be omitted.

When the correlation maximum value is detected in a first preamble determination period T3 as a result of correlation maximum value detection determination (in step S23), first preamble determination is made (in step S25).

When a result of the first preamble determination (in step S25) does not succeed (No in step S26), the procedure returns to step S3. On the other hand, when the result of the first preamble determination (in step S25) succeeds (Yes in step S26), the first preamble determination flag is set to "1" (in step S27), and the procedure returns to step S3.

When it is determined that the timing of the current correlation result is not in the first preamble determination period (No in step S22), determination of the first preamble determination flag is made (in step S28). When the first preamble determination succeeds, the preamble determination flag is set to "1" (Yes in step S28), and the procedure proceeds to step S31. The control unit 17 sets a second symbol timing determination period T6 (a second erroneous detection determination delay period T4+the second erroneous detection determination period T51+the second erroneous detection determination period T52+the second erroneous detection determination period T53+the second erroneous detection determination stop period T91+the second erroneous detection determination stop period T92) before a second preamble determination period T3 on the basis of the symbol timing, and checks whether or not the symbol timing established earlier is a true symbol timing (in steps S31 to S38). The check processing (in steps S31 to S38) is the same as the check processing (in steps S13 to S21) before the symbol timing is established. Thus, detailed description of the check processing will be omitted.

When the first preamble determination does not succeed, the preamble determination flag is set to "0" (No in step S28). The detected correlation peak value is initialized (in step S30), the initialization processing A is performed (in step S6), and the procedure returns to step S3.

Correlation maximum value detection determination and second preamble determination are performed in the second preamble determination period T3 on the basis of the symbol timing. Processing in steps S40 to S47 is the same as that in the first preamble determination (in steps S22 to S30). Thus, detailed description of the processing in steps S40 to S47 will be omitted.

Determination of the second preamble determination flag is made (in step S46). When the second preamble determination also succeeds, the preamble determination flag is set to "1" (Yes in step S46). The control unit 17 outputs "1" as the preamble detection result W indicating detection of a preamble (in step S48), thereby finishing detection of the preamble.

On the other hand, when the second preamble determination does not succeed, the preamble determination flag is set to "0" (No in step S46), the detected correlation peak value is initialized (in step S47), the initialization processing A is performed (in step S6), and the procedure returns to step S3.

Figure 7:
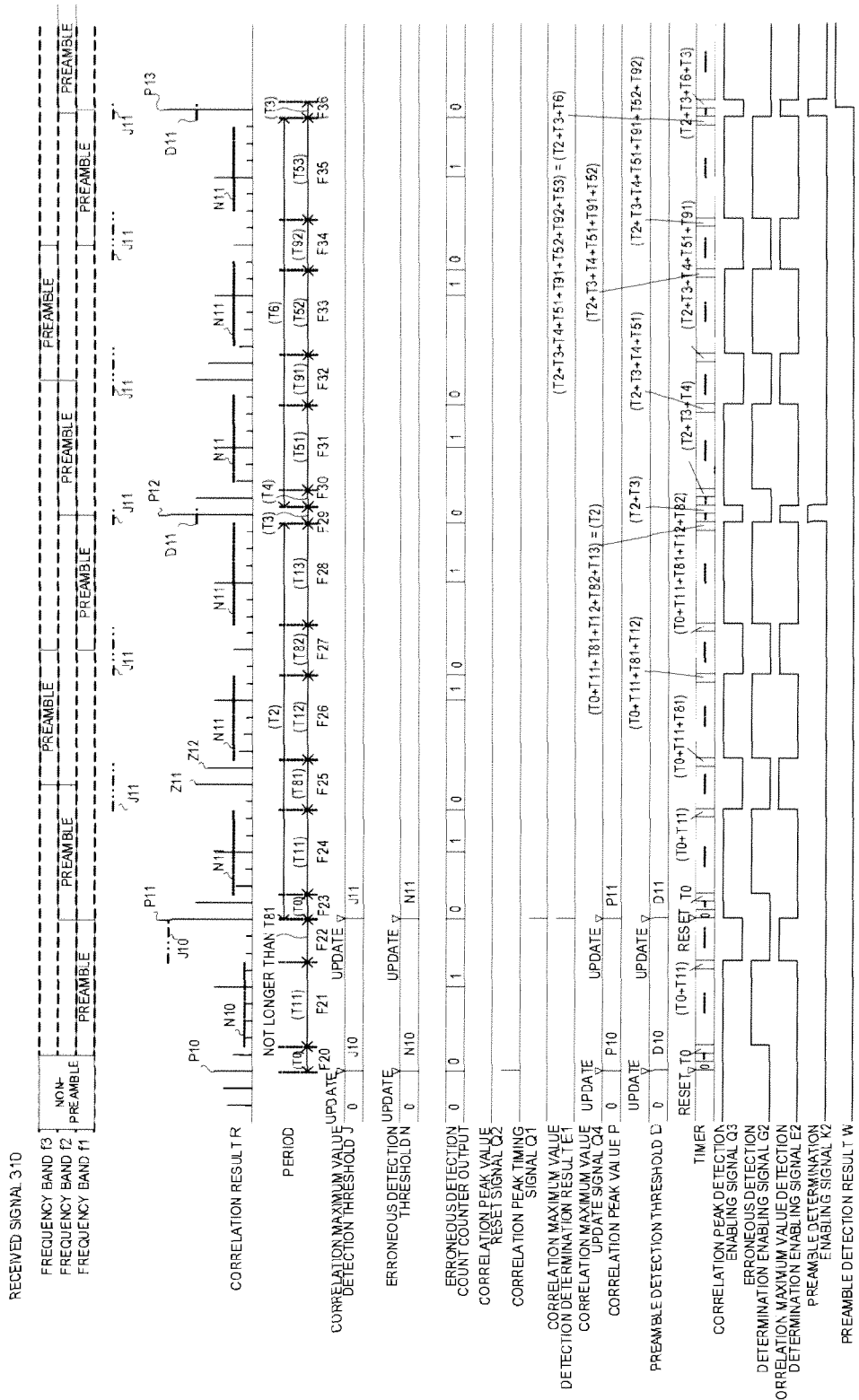
FIG. 7 is a diagram showing, as an example, a timing chart that indicates an operation of a detection execution unit in the preamble detection apparatus in the exemplary embodiment.

FIG. 7 is a diagram showing a timing chart indicating an operation of the detection execution unit 20 in the preamble detection apparatus 10 in this exemplary embodiment as an example. Referring to FIG. 7, the operation of the detection execution unit 20 will be described.

The timing chart described in FIG. 7 shows the operation of regarding that a preamble has been detected according to the following conditions. That is, when a correlation peak value P11 of the preamble in the standby frequency band is detected after a correlation peak value P10 caused by noise of a non-preamble, and when correlation results P12 and P13 that exceed the preamble detection threshold D twice are present from the timing of detection of the correlation peak value P11 during the frequency hopping cycles, it is regarded that the preamble has been detected.

It is assumed in the timing chart described in FIG. 7 that a received signal 310 is frequency-hopped in the order of frequency bands f1, f2, f3, f1, and so on. It is assumed that the standby frequency is the frequency band f1 and an LO spurious signal is produced in the frequency band f2. It is further assumed that the received signal 310 is a strong input signal that exceeds an ADC dynamic range.

Assume that the correlation peak value P10 caused by the noise of the non-preamble, which is a maximum value of the correlation results R so far obtained, is detected in the example shown in FIG. 7. Then, the correlation peak value P is updated by the correlation peak detection unit 12 at a timing when the correlation peak value P10 has been detected, and the correlation peak value P10 is held as the correlation peak value P. Together with holding of the correlation peak value P10, the correlation peak timing signal Q1 that will be output from the correlation peak detection unit 12 is set to "1." Together with setting of the correlation peak timing signal Q1 to "1," the correlation maximum value detection threshold J is set to J10, the erroneous detection threshold N is set to N10, the preamble detection threshold D is set to D10, and the timer is reset to zero.

Next, it is determined whether or not the timing of the correlation peak value P10 held as the correlation peak value P is a symbol timing or not. No correlation result exceeds the correlation peak value P10 in the first erroneous detection determination delay period T0 (which is a period F20 in FIG. 7) on the basis of the correlation peak value P10. Thus, the first erroneous detection determination delay period T0 elapses without updating of the correlation peak value P, and the operation proceeds to a first erroneous detection determination period T11.

Next, in the first erroneous detection determination period T11 (which is a period F21 in FIG. 7) on the basis of the correlation peak value P10, correlation peak detection by the correlation peak detection unit 12 and erroneous detection determination by the erroneous detection determination unit 114 are performed. No correlation result R exceeds the correlation peak value P10, thus the correlation peak value P is not updated. Further, the number of times in which the correlation results R exceed the erroneous detection threshold N10 is not larger than a predetermined number of times. Thus, it is not determined that erroneous detection has occurred. Then, the first erroneous detection determination period T11 elapses, and the operation proceeds to the first erroneous detection determination stop period T81.

Next, in the first erroneous detection determination stop period T81 (which is a period F22 in FIG. 7) on the basis of the correlation peak value P10, correlation maximum value detection determination by the correlation maximum value detection determination unit 19 is made. The correlation peak value P11 among the correlation results R within the first erroneous detection determination stop period T81 on the basis of the correlation peak value P10 has exceeded the correlation maximum value detection threshold J10. Thus, the correlation maximum value detection determination result E1 becomes active, and it is determined that a correlation maximum value has been detected at the timing of the correlation peak value P11. Since the correlation maximum value has been detected in the first erroneous detection determination stop period T81 on the basis of the correlation peak value P10, the period F22 in which determination of erroneous detection has actually been performed about the correlation peak value P10 is not larger than the first erroneous detection determination stop period T81.

When it is determined that the correlation maximum value has been detected, the control unit 17 activates the correlation maximum value update signal Q4, thereby performing control so that the correlation peak value P10 held in the correlation peak detection unit is updated. By activation of the correlation maximum value update signal Q4, the correlation peak detection unit 12 updates the correlation peak value P to the correlation result P11 and holds the correlation result P11. In this case, the correlation result R is masked by zero, and the correlation mask unit output M is zero in the correlation mask unit 32 within the correlation peak detection unit 12. Thus, the correlation peak timing signal Q1 does not become active. Due to updating to the correlation result P11, the correlation result P11 is multiplied by the coefficient δ to obtain a correlation maximum value detection threshold J11. The correlation result P11 is multiplied by a coefficient a to obtain an erroneous detection threshold N11, and the correlation result P11 is multiplied by a coefficient β to obtain a preamble detection threshold D11. Further, the timer is initialized to start over the processing at a time when the reset has been made.

The correlation peak value is not updated in the first erroneous detection determination delay period T0 (which is a period F23 in FIG. 7) and the first erroneous detection determination period T11 (which is a period F24 in FIG. 7) on the basis of the correlation result P11, and it is not determined in the first erroneous detection determination period T11 (which is the period 24 in FIG. 7) that error detection has been made. Thus, the procedure proceeds to the processing in the first erroneous detection determination stop period T81 (in a period 25 in FIG. 7) on the basis of the correlation result P11.

Though correlation results Z11 and Z12 caused by LO spurious components occur in the first erroneous detection determination stop period T81 (in the period F25 in FIG. 7) on the basis of the correlation result P11, error detection determination is forbidden in the first erroneous detection determination stop period T81. Thus, an erroneous detection count counter is not counted up by the correlation results Z11 and Z12. The correlation results Z11 and Z12 do not exceed the correlation maximum value detection threshold J11. Thus, the first erroneous detection determination stop period T81 (period F25 in FIG. 7) is finished, and the procedure proceeds to the first erroneous detection determination period T12.

The correlation peak value is not updated, and error detection is not determined in the first erroneous detection determination period T12 (in a period F26 in FIG. 7) and the first erroneous detection determination period T13 (in a period F28 in FIG. 7) on the basis of the correlation result P11. Further, a correlation maximum value is not detected in a first erroneous detection determination stop period T82 (in a period F27 in FIG. 7) on the basis of the correlation result P11. Thus, a first symbol timing determination period on the basis of the correlation result P11 is finished, and the procedure proceeds to a first-time preamble determination period (No in step S16 in FIG. 6B).

The correlation maximum value determination processing and first-time preamble determination processing are performed in the first preamble determination period T3 (in a period F29 in FIG. 7) on the basis of the correlation result P11. As a result, first-time preamble determination succeeds on a correlation result P12 that does not exceed the correlation maximum value detection threshold J11 and exceeds the preamble detection threshold D11. Second-time symbol timing determination and second-time preamble determination are performed after the first-time preamble determination has succeeded.

The correlation peak value is not updated in a second erroneous detection determination delay period T4 (in a period F30 in FIG. 7) on the basis of the correlation result P11, and the correlation peak value is not updated and erroneous detection is not determined in second erroneous detection determination stop periods T51 (in a period F31 in FIG. 7), T52 (in a period F33 in FIG. 7), T53 (in a period F35 in FIG. 7) on the basis of the correlation result P11. Further, the correlation maximum value is not detected in second erroneous detection determination stop periods T91 (in a period F32 in FIG. 7) and T92 (in a period F34 in FIG. 7) on the basis of the correlation result P11. Thus, the procedure proceeds to the second preamble determination period.

The correlation maximum value detection determination processing and second-time preamble determination processing are performed in the second preamble determination period T3 (in a period F36 in FIG. 7) on the basis of the correlation result P11. As a result, second-time preamble determination succeeds on a correlation result P13 that does not exceed the correlation maximum value detection threshold J11 and exceeds the preamble detection threshold D11. The control unit 17 outputs "1" as the preamble detection result W, and preamble detection is thereby finished.

Figure 8:
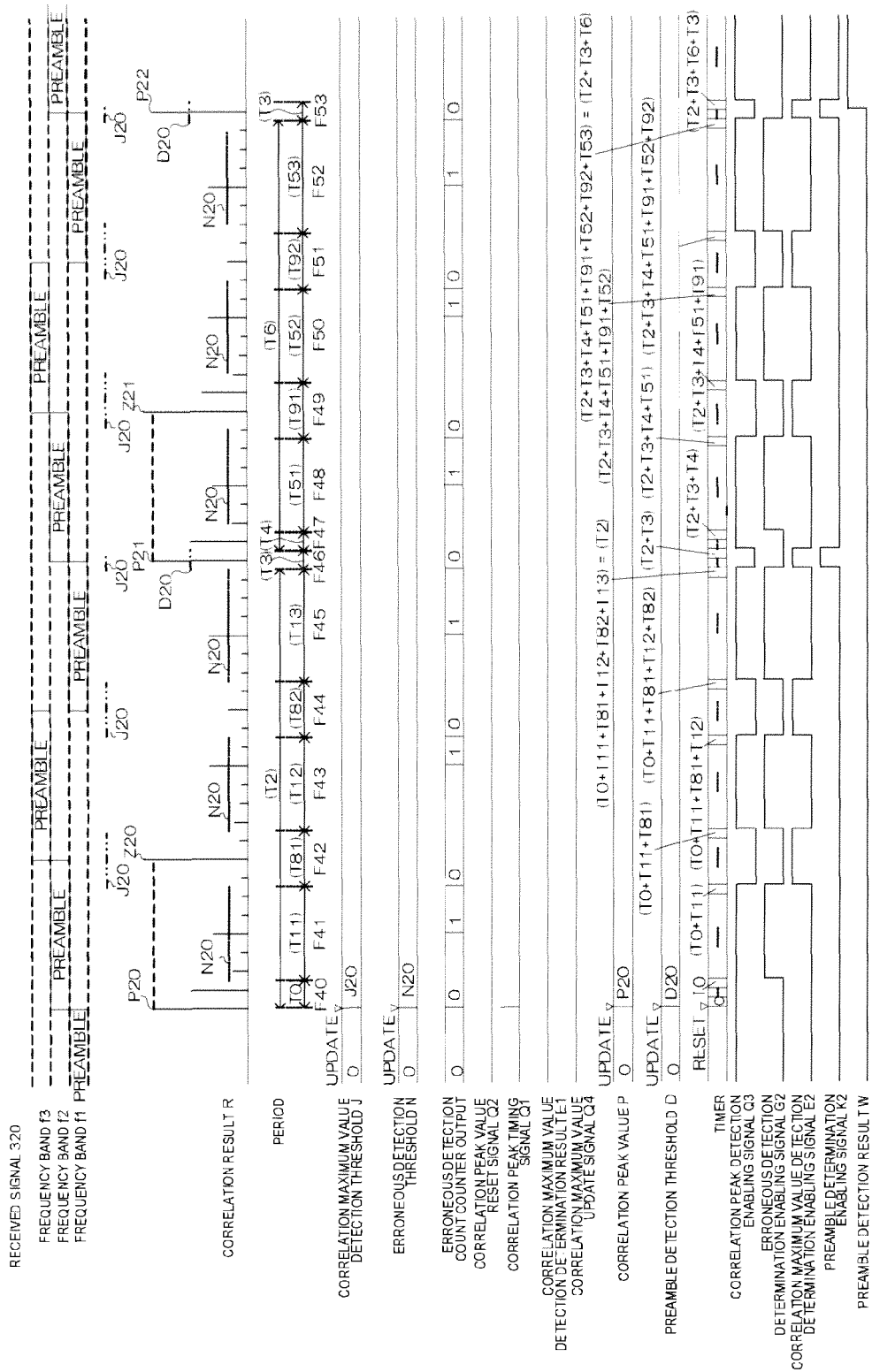
FIG. 8 is a diagram showing, as an example, a timing chart that indicates an operation of the detection execution unit in the preamble detection apparatus in the exemplary embodiment.

FIG. 8 is a diagram showing a timing chart indicating an operation of the detection execution unit 20 of the preamble detection apparatus 10 in this exemplary embodiment as an example. The timing chart described in FIG. 8 shows the operation of regarding that a preamble has been detected according to the following conditions. That is, when a correlation peak value P20 of the preamble in the standby frequency band is detected, and when correlation results P21 and P22 that exceed the preamble detection threshold D two times from the timing of the detecting the correlation peak value P20 during the frequency hopping cycles, it is regarded that the preamble has been detected.

It is assumed that a received signal 320 in the timing chart described in FIG. 8 is a strong input signal that exceeds the received signal 310 described in FIG. 7, and that due to occurrence of a clip, there is not a level difference between the correlation peak value of the preamble in the standby frequency band and a correlation peak caused by an LO spurious component, and the level of the correlation peak caused by the LO spurious component slightly exceeds due to the influence of noise. Conditions of the received signal 320 other than the level of the received signal are assumed to be the same as those of the received signal 310 described in FIG. 7.

A flow of a sequence of processing from detection of the correlation peak value P20 of the preamble in the standby frequency band to determination of preamble detection on the correlation peak value P22 in the example shown in FIG. 8 is the same as that of the sequence of processing shown in FIG. 7 from detection of the correlation peak value P11 to determination of the preamble detection on the correlation peak value P13. Thus, detailed description of the processing will be omitted.

After the correlation peak value P20 has been detected, and then a correlation maximum value detection threshold J20, an erroneous detection threshold N20, and a preamble determination threshold D20 have been obtained, the correlation peak is not updated in the first erroneous detection determination delay period T0 (which is a period F40 in FIG. 8) and the first erroneous detection determination period T11 (which is a period F41 in FIG. 8) on the basis of the correlation peak value P20. Further, erroneous detection is not determined in the first erroneous detection determination period T11 (which is the period F41 in FIG. 8). Thus, the procedure proceeds to the first erroneous detection determination stop period T81 (which is a period F42 in FIG. 8) on the basis of the correlation result P20.

In the first erroneous detection determination stop period T81 on the basis of the correlation peak value P20, a correlation result Z20 caused by the LO spurious component occurs. As described above, the level of the correlation result Z20 is slightly larger than the level of the correlation peak value 20 due to the influences of occurrence of the clip caused by reception of the strong input and a variation caused by the noise. In the first erroneous detection determination stop period T81 on the basis of the correlation peak value P20, the correlation maximum value detection determination processing by the correlation maximum value detection determination unit 19 is performed. The correlation maximum value detection determination processing is different from the correlation peak detection processing. The held value of the correlation peak value P20 is not compared with the correlation result Z20, but is compared with the correlation maximum value detection threshold value J20 generated by the correlation maximum value detection threshold generation unit 18. Thus, the first erroneous detection determination stop period T81 is finished with the correlation peak value P not updated by the correlation result Z20. Then, the rest of symbol timing determination processing on the basis of the correlation peak value P20 is continued.

Then, processing which is the same as that executed in a period from the period F26 to the period F36 shown in FIG. 7 is executed in a period from a period F43 to a period F53 in FIG. 8 to obtain the same result. Then, "1" is output as the preamble detection result W for the correlation peak value P22.

Using that the occurrence period of a correlation peak caused by LO spurious can be estimated from a detected correlation peak position and the frequency hopping pattern, the preamble detection apparatus in this exemplary embodiment estimates every period centering on a position where a distance from the correlation peak position is an integer multiple of the symbol length excluding an integer multiple of the frequency hopping cycle, as the occurrence period of the correlation peak caused by the LO spurious. Then, the preamble detection apparatus sets the estimated occurrence period of the correlation peak caused by the LO spurious to a monitor target erroneous detection determination stop period to which the erroneous detection threshold that detects non-occurrence of a correlation peak is not applied.

With this arrangement, a window period of each certain symbol length starting from a detected correlation peak can be regarded as the occurrence period of a correlation peak caused by an LO spurious component. Then, the occurrence period of the correlation peak caused by the LO spurious component can be excluded from a monitor target period to which the erroneous detection threshold is applied. In this case, the correlation peak caused by the LO spurious component can be avoided to be determined as the "presence of a correlation result that exceeds the erroneous detection threshold." Then, as a result, determination of a desired wave as having been erroneously detected (namely undetection of the desired wave) can be prevented.

Further, by excluding a minimum necessary period from the monitor target period to which the erroneous detection threshold is applied, the need for relaxing the erroneous detection threshold is eliminated. In this case, erroneous preamble detection of a signal of a wave other than the desired wave and the demodulation process of the signal can be prevented. Undetection of the desired wave that may have been transmitted during the erroneous preamble detection and the demodulation process can be prevented.

Further, in the preamble detection apparatus in this exemplary embodiment, the correlation maximum value detection threshold that is set on the basis of a correlation peak value is provided, and the presence of a correlation value that exceeds the correlation maximum value detection threshold is monitored in the erroneous detection determination stop period and the preamble determination period which is open at constant intervals, starting from the correlation peak position. Undetection of a desired correlation peak in the erroneous detection determination stop period or the preamble determination period can be thereby prevented. Further, when a correlation peak caused by an LO spurious component having a level larger than the level of a desired correlation value occurs in the erroneous detection determination stop period, undetection of a desired correlation peak can be thereby prevented.

When a signal caused by noise is received first and then an undesired correlation peak value is detected, a desired correlation peak, or the correlation peak value of the preamble in the standby frequency band may possibly occur in the erroneous detection determination stop period or the preamble detection period. A level difference between the desired correlation peak value and the undesired correlation peak value is manifest, and the desired correlation peak value often has a level greater than that of the value of the undesired correlation peak. Accordingly, the correlation maximum value detection threshold set on the basis of the undesired correlation peak value and determined by multiplying the undesired correlation peak value detected earlier than the desired correlation peak value by a certain coefficient of not less than one is set to a value whereby only a correlation result having a certain level or higher than that of the undesired correlation peak value can be detected. As a result, the desired correlation peak value that occurs in the erroneous detection determination stop period or the preamble detection period can be detected, and preamble detection processing can be performed again, starting from the detected correlation peak value. Accordingly, undetection of the desired correlation peak value that has occurred in the erroneous detection stop period or the preamble detection period can be prevented.

In the preamble detection apparatus in this exemplary embodiment, a window for each certain symbol length is opened starting from a first detected correlation peak, and the period of the window is set to the occurrence period of a correlation peak caused by an LO spurious component. In this case, only the minimum necessary period can be excluded from a monitor target to which the erroneous detection threshold is applied, and the need for relaxing the erroneous detection threshold is eliminated. Accordingly, deterioration of identification performance of a desired wave can be prevented. At the same time, the desired wave can be prevented from being determined as having been erroneously detected. Consequently, according to the preamble detection apparatus in this exemplary embodiment, when LO spurious occurs and a strong input signal is received, deterioration of a preamble detection characteristic can be prevented.

The preamble detection apparatus in this exemplary embodiment monitors the erroneous detection determination stop period and the preamble determination period that is open at certain intervals, starting from the correlation peak position, using the correlation maximum value detection threshold. In this case, when a desired correlation peak occurs in the erroneous detection determination stop period or the preamble determination period after an undesired correlation peak has been detected earlier than the desired correlation peak, undetection of the desired correlation peak can be prevented. Further, when a correlation peak caused by an LO spurious component that slightly exceeds a desired correlation peak occurs in the erroneous detection determination stop period after detection of the desired correlation peak, undetection of a desired correlation peak resulting from updating of the correlation peak caused by the LO spurious component as a new correlation peak and execution of preamble detection at an erroneous timing can also be prevented.

Each disclosure of Patent Document described above is incorporated herein by reference. In the framework of entire disclosure of the present invention (including the claims), and based on its basic technological idea, exemplary embodiments or examples of the present invention may be changed and/or adjusted. Also it should be noted that in the framework of the claims of the present invention, any combinations or selections of various elements disclosed herein are possible. That is, needless to say, it is understood by those skilled in the art that various changes or modifications can be made to the present invention based on the disclosure of the present invention including the claims and drawings and the technological idea of the present invention.

What is claimed is:

1. A preamble detection apparatus in a wireless communication system which performs frequency hopping, comprising:

a correlation maximum value detection threshold generation unit that determines a correlation maximum value detection threshold on the basis of a correlation peak value;

a correlation maximum value detection determination unit that detects one of correlation results, which exceeds the correlation maximum value detection threshold, as a correlation maximum value;
a correlation peak detection unit that updates the correlation peak value to the detected correlation maximum value when the correlation maximum value is detected by the correlation maximum value detection determination unit; and
a control unit that sets a period, if a correlation peak caused by an LO (Local Oscillator) spurious component occurs, to a first period, sets a period, centering on a position where a distance from a correlation peak position is an integer multiple of a frequency hopping cycle, to a second period, and monitors presence or absence of a correlation result that exceeds the correlation maximum value detection threshold in the first and second periods, while not applying an erroneous detection threshold to the first period.

2. The preamble detection apparatus according to claim 1, wherein
the first period is a window period centering on a position where a distance from the correlation peak position is an integer multiple of a symbol length other than the integer multiple of the frequency hopping cycle.

3. The preamble detection apparatus according to claim 1, wherein
the second period is a window period centering on the position where the distance from the correlation peak position is the integer multiple of the frequency hopping cycle.

4. The preamble detection apparatus according to claim 2, wherein
the second period is a window period centering on the position where the distance from the correlation peak position is the integer multiple of the frequency hopping cycle.

5. The preamble detection apparatus according to claim 1, wherein
the correlation maximum value detection threshold generation unit sets the correlation maximum value multiplied by a predetermined coefficient to the correlation maximum value detection threshold.

6. The preamble detection apparatus according to claim 5, wherein
the predetermined coefficient is not less than one.

7. The preamble detection apparatus according to claim 1, wherein
when a first detected correlation peak is an undesired correlation peak, the preamble detection apparatus detects that the correlation result which exceeds the correlation maximum value detection threshold is present in the first period or the second period, and updates the first detected correlation peak by a correlation peak corresponding to the correlation result to start over preamble detection processing; and
when the first detected correlation peak is a desired correlation peak, the preamble detection apparatus detects that the correlation result which exceeds the correlation maximum value detection threshold is not present in the first period, and continues the preamble detection processing without updating the correlation peak.

8. A preamble detection method in a wireless communication system that performs frequency hopping, comprising:
determining a correlation maximum value detection threshold on the basis of a correlation peak value;
detecting one of correlation results, which exceeds the correlation maximum value detection threshold, as a correlation maximum value;
updating the correlation peak value to the detected correlation maximum value when the correlation maximum value is detected;
setting a period, in the event if a correlation peak caused by an LO (Local Oscillator) spurious component occurs, to a first period, and setting a period, centering on a position where a distance from a correlation peak position is an integer multiple of a frequency hopping cycle, to a second period; and
monitoring presence or absence of a correlation result that exceeds the correlation maximum value detection threshold in the first and second periods, while not applying an erroneous detection threshold to the first period.

9. The preamble detection method according to claim 8, wherein
the first period is a window period centering on a position where a distance from the correlation peak position is an integer multiple of a symbol length other than the integer multiple of the frequency hopping cycle.

10. The preamble detection method according to claim 8, wherein
the second period is a window period centering on the position where the distance from the correlation peak position is the integer multiple of the frequency hopping cycle.

11. The preamble detection apparatus according to claim 9, wherein
the second period is a window period centering on the position where the distance from the correlation peak position is the integer multiple of the frequency hopping cycle.

12. A non-transitory computer readable storage medium having machine instructions stored therein, the instructions being executable by one or more computers to cause the one or more computers to perform operations comprising:
determining a correlation maximum value detection threshold on the basis of a correlation peak value;
detecting one of correlation results, which exceeds the correlation maximum value detection threshold, as a correlation maximum value;
updating the correlation peak value to the detected correlation maximum value when the correlation maximum value is detected;
setting a period, if a correlation peak caused by an LO (Local Oscillator) spurious component occurs, to a first period, and setting a period, centering on a position where a distance from a correlation peak position is an integer multiple of a frequency hopping cycle, to a second period; and
monitoring presence or absence of a correlation result that exceeds the correlation maximum value detection threshold in the first and second periods, while not applying an erroneous detection threshold to the first period.

13. The non-transitory computer readable storage medium according to claim 12, wherein
the first period is a window period centering on a position where a distance from the correlation peak position is an integer multiple of a symbol length other than the integer multiple of the frequency hopping cycle.

14. The non-transitory computer readable storage medium according to claim 12, wherein the second period is a window period centering on the position where the distance from the correlation peak position is the integer multiple of the frequency hopping cycle.

15. The non-transitory computer readable storage medium according to claim 13, wherein the second period is a window period centering on the position where the distance from the correlation peak position is the integer multiple of the frequency hopping cycle.

* * * * *